United States Patent
Basso

(10) Patent No.: US 12,417,627 B2
(45) Date of Patent: Sep. 16, 2025

(54) METHODS FOR MAPPING TEMPORAL AND SPATIAL STABILITY AND SUSTAINABILITY OF A CROPPING SYSTEM

(71) Applicant: BOARD OF TRUSTEES OF MICHIGAN STATE UNIVERSITY, East Lansing, MI (US)

(72) Inventor: Bruno Basso, East Lansing, MI (US)

(73) Assignee: BOARD OF TRUSTEES OF MICHIGAN STATE UNIVERSITY, East Lansing, MI (US)

(*) Notice: Subject to any disclaimer, the term of this patent is extended or adjusted under 35 U.S.C. 154(b) by 0 days.

(21) Appl. No.: 16/343,933

(22) PCT Filed: Oct. 24, 2017

(86) PCT No.: PCT/US2017/057974
§ 371 (c)(1),
(2) Date: Apr. 22, 2019

(87) PCT Pub. No.: WO2018/081043
PCT Pub. Date: May 3, 2018

(65) Prior Publication Data
US 2019/0335674 A1    Nov. 7, 2019

Related U.S. Application Data

(60) Provisional application No. 62/411,976, filed on Oct. 24, 2016.

(51) Int. Cl.
*G06Q 50/02* (2024.01)
*G01C 11/04* (2006.01)
(Continued)

(52) U.S. Cl.
CPC ........... *G06V 20/188* (2022.01); *G01C 11/04* (2013.01); *G01N 21/27* (2013.01); *G06Q 10/06313* (2013.01); *G06Q 50/02* (2013.01)

(58) Field of Classification Search
CPC .......... A01G 7/00; A01G 22/40; A01G 22/20; A01B 79/005; G01C 11/04; G01N 21/27;
(Continued)

(56) References Cited

U.S. PATENT DOCUMENTS 4,755,942 A * 7/1988 Gardner .................. A01G 25/16
  47/1.01 R
4,992,942 A * 2/1991 Bauerle .................. A01G 31/00
  700/284
(Continued)

FOREIGN PATENT DOCUMENTS

| JP | 2012516684 | * | 7/2012 |
| WO | WO-2016/090212 A1 | | 6/2016 |
| WO | WO-2016/183182 A1 | | 11/2016 |

OTHER PUBLICATIONS

Colbach, N., Forcella, F., & Johnson, G. (2000). Spatial and temporal stability of weed populations over five years. Weed Science, 48(3), 366-377. doi:10.1614/0043-1745(2000)048[0366:SATSOW]2.0.CO;2 (Year: 2000).*
(Continued)

*Primary Examiner* — Magdalena Topolski
(74) *Attorney, Agent, or Firm* — MARSHALL, GERSTEIN & BORUN LLP

(57) ABSTRACT

Crop modeling methods can be used for mapping temporal and spatial stability and sustainability of a cropping system. In some methods, remote sensing imagery over multiple time series elements (such as for past growing seasons) is used to characterize small-scale field stability and variability relative to larger surrounding land areas. In some methods, remote sensing imagery over multiple time series elements (such as for the growing season) is used to characterize small-scale field stability and variability relative to larger surrounding land areas. In some methods, a crop model is used to determine dependent cropping system parameters (Continued)

related to agricultural sustainability, which can be used to characterize small-scale field sustainability scores for such parameters relative to larger surrounding land areas. Such stability and sustainability maps can inform crop management activities for fields in the larger land areas and on the smaller scales, for example using crop models to determine such crop management activities to improve crop productivity, improve economic productivity, and/or reduce adverse environmental impact for the field as a whole and/or sub-regions thereof.

25 Claims, 10 Drawing Sheets

(51) Int. Cl.
  *G01N 21/27* (2006.01)
  *G06Q 10/0631* (2023.01)
  *G06V 20/10* (2022.01)
(58) Field of Classification Search
  CPC ......... G06K 9/00657; G06Q 10/06313; G06Q 50/02
  See application file for complete search history.

(56) References Cited

U.S. PATENT DOCUMENTS

| | | | | |
|---|---|---|---|---|
| 5,130,925 | A * | 7/1992 | Janes | G06Q 10/06 702/2 |
| 5,479,339 | A * | 12/1995 | Miller | A01G 25/167 700/16 |
| 6,337,971 | B1 * | 1/2002 | Abts | A01G 25/092 331/65 |
| 6,662,185 | B1 * | 12/2003 | Stark | A01G 7/00 |
| 7,103,479 | B2 * | 9/2006 | Patwardhan | A01G 25/16 702/12 |
| 9,113,590 | B2 * | 8/2015 | Johnson | A01G 22/00 |
| 10,188,049 | B1 * | 1/2019 | Emanuel | A01G 25/16 |
| 10,477,756 | B1 * | 11/2019 | Richt | G06Q 50/02 |
| 10,482,539 | B2 * | 11/2019 | Basso | G06Q 10/06314 |
| 2010/0306012 | A1 * | 12/2010 | Zyskowski | G06Q 10/06 705/7.36 |
| 2011/0313666 | A1 * | 12/2011 | Hirvi | A01G 22/00 702/2 |
| 2012/0237083 | A1 * | 9/2012 | Lange | G06K 9/00805 382/103 |
| 2014/0035752 | A1 * | 2/2014 | Johnson | A01G 22/00 340/601 |
| 2014/0278731 | A1 * | 9/2014 | Griffin | G06Q 10/0635 705/7.28 |
| 2015/0201605 | A1 | 7/2015 | Groeneveld | |
| 2015/0278966 | A1 * | 10/2015 | Johnson | G06Q 50/02 702/2 |
| 2016/0078570 | A1 * | 3/2016 | Ethington | G06Q 10/1097 705/7.21 |
| 2016/0180473 | A1 * | 6/2016 | Groeneveld | A01G 22/00 705/7.25 |
| 2016/0239709 | A1 | 8/2016 | Shriver | |
| 2017/0196171 | A1 * | 7/2017 | Xu | G06Q 50/02 |
| 2017/0351790 | A1 * | 12/2017 | Farah | G06Q 50/02 |
| 2018/0181893 | A1 * | 6/2018 | Basso | G06Q 10/06 |
| 2018/0373932 | A1 * | 12/2018 | Albrecht | G06F 17/14 |
| 2019/0050948 | A1 * | 2/2019 | Perry | G06Q 10/04 |
| 2019/0335674 | A1 * | 11/2019 | Basso | G01C 11/04 |

OTHER PUBLICATIONS

Basso et al., Environmental and economic evaluation of N fertilizer rates in a maize crop in Italy: A spatial and temporal analysis using crop models, Biosystems Engineering, 113:103-111 (2012).
Broge et al., Comparing prediction power and stability of broadband and hyperspectral vegetation indices for estimation of green leaf area index and canopy chlorophyll density, Remote Sensing of Environment, 76:156-72 (2000).
Cammarano et al., Assessing the robustness of vegetation indices to estimate wheat N in Mediterranean environments, Remote Sens., 6:2827-44 (2014).
Cammarano et al., Use of the Canopy Chlorophyl Content Index (CCCI) for remote estimation of wheat nitrogen content in rainfed environments, Agron. J., 103(6):1597-603 (2011).
Curran et al., Exploring the relationship between reflectance red edge and chlorophyll concentration in slash pine leaves, Tree Physiol., 15(3):203-6 (Mar. 1995).
Daughtry et al., Estimating Corn Leaf Chlorophyll Concentration from Leaf and Canopy Reflectance, Remote Sensing Environment, 74(2):229-39 (Nov. 2000).
Gitelson et al., Spectral Reflectance Changes Associated with Autumn Senescence of Aesculus hippocastanum L. and Acer platanoides L. Leaves. Spectral Features and Relation to Chlorophyll Estimation, J. Plant Physiol., 143(3):286-92 (Mar. 1994).
Haboudane et al., Hyperspectral vegetation indices and novel algorithms for predicting green LAI of crop canopies: Modeling and validation in the context of precision agriculture, Remote Sensing Environment, 90(3):337-52 (Apr. 2004).
International Application No. PCT/US2017/057974, International Search Report and Written Opinion, dated Feb. 13, 2018.
Nasir et al., Comparison of NDVI and supervised image classification to assess vegetative land cover in Ghazi Tehsil, District Haripur, Pakistan, Pak. J. Pl. Sci., 18(1):73-84 (2012).
Sands et al., A generalized environmental sustainability index for agricultural systems, Agriculture, Ecosystems and Environment, 79:29-41 (2009).
Sims et al., Relationships between leaf pigment content and spectral reflectance across a wide range of species, leaf structures and developmental stages, Remote Sensing Environment, 81(2-3):337-54 (Aug. 2002).
Tao et al., Temporal and spatial changes of maize yield potentials and yield gaps in the past three decades in China, Agriculture, Ecosystems and Environment, 208:12-20 (2015).
Vogelmann et al., Red edge spectral measurements from sugar maple leaves, Int. J. Remote Sensing, 14(8):1563-75 (1993).
International Preliminary Report on Patentability and Written Opinion of the International Searching Authority in International Application No. PCT/US2017/057974, dated Apr. 30, 2019 (9 pages).
Colbach et al., Spatial and temporal stability of weed populations over five years, Weed Science, 48(3):366-377 (May 2000).
European Patent Application No. 17865699, Communication Pursuant to Rule 164(1) EPC, dated Apr. 24, 2020.
European Patent Application No. 22211417.5, Partial European Search Report, dated Jul. 21, 2023.

* cited by examiner

Sustainability Index

Percentile

| Yield | | |
|---|---|---|
| Percentile | score | |
| 0-25 | poor | 1 |
| 26-50 | medium | 1.33 |
| 51-75 | good | 1.66 |
| 76-100 | excellent | 2 |

| NUE | | |
|---|---|---|
| 0-25 | poor | 1 |
| 26-50 | medium | 1.33 |
| 51-75 | good | 1.66 |
| 76-100 | excellent | 2 |

| WUE | | |
|---|---|---|
| 0-25 | poor | 1 |
| 26-50 | medium | 1.33 |
| 51-75 | good | 1.66 |
| 76-100 | excellent | 2 |

| Runoff | | |
|---|---|---|
| 0-25 | poor | 1 |
| 26-50 | medium | 1.33 |
| 51-75 | good | 1.66 |
| 76-100 | excellent | 2 |

| Leaching | | |
|---|---|---|
| amount | score | |
| 0-25 | excellent | 2 |
| 26-50 | good | 1.66 |
| 51-75 | medium | 1.33 |
| 76-100 | poor | 1 |

| CO2 emissions | | |
|---|---|---|
| amount | score | |
| 0-25 | excellent | 2 |
| 26-50 | good | 1.66 |
| 51-75 | medium | 1.33 |
| 76-100 | poor | 1 |

| C% change | | |
|---|---|---|
| 0-25 | excellent | 2 |
| 26-50 | good | 1.66 |
| 51-75 | medium | 1.33 |
| 76-100 | poor | 1 |

| N2O | | |
|---|---|---|
| 0-25 | excellent | 2 |
| 26-50 | good | 1.66 |
| 51-75 | medium | 1.33 |
| 76-100 | poor | 1 |

FIGURE 8

METHODS FOR MAPPING TEMPORAL AND SPATIAL STABILITY AND SUSTAINABILITY OF A CROPPING SYSTEM

CROSS REFERENCE TO RELATED APPLICATION

This application is a National Stage application of International Application No. PCT/US2017/057974, filed Oct. 24, 2017, which claims the benefit of U.S. Provisional Application No. 62/411,976 filed Oct. 24, 2016, which is incorporated herein by reference in its entirety.

STATEMENT OF GOVERNMENT INTEREST

This invention was made with government support under 2015-68007-23133 awarded by the U.S. Department of Agriculture. The government has certain rights in the invention.

BACKGROUND OF THE DISCLOSURE

Field of the Disclosure

The disclosure relates to methods for mapping temporal and spatial stability and sustainability of a cropping system. In some methods, remote sensing imagery over multiple time series elements (such as for past growing seasons) is used to characterize small-scale field stability and variability relative to larger surrounding land areas. In some methods, remote sensing imagery over multiple time series elements (such as for the growing season) is used to characterize small-scale field stability and variability relative to larger surrounding land areas. In some methods, a crop model is used to determine dependent cropping system parameters related to agricultural sustainability, which can be used to characterize small-scale field sustainability scores for such parameters relative to larger surrounding land areas. Such stability and sustainability maps can inform crop management activities for fields in the larger land areas and on the smaller scales, for example using crop models to determine such crop management activities to improve crop productivity, improve economic productivity, and/or reduce adverse environmental impact for the field as a whole and/or sub-regions thereof.

SUMMARY

Stability Mapping.

In one embodiment, the disclosure relates to a method for mapping temporal and spatial stability of a cropping system, the method comprising: (a) providing a plurality of images in a time series, the images (i) spanning a large-scale cropping system land unit having at least one of soybean and corn crop plants planted thereon (e.g., growing post-emergence thereon), and (ii) comprising a plurality of small-scale image subunits encompassing the large-scale cropping system land unit; wherein images at a given element in the time series correspond to a canopy saturation time point in a growth season for the cropping system; (b) determining at each time series element an average (e.g., mean, median, mode) optical vegetative index (OVI) for the large-scale cropping system land unit based on the small-scale image subunits therein at the time series element and having the crop plants thereon; (c) determining for each small-scale image subunit having the crop plants at each time series element the optical vegetative index for the small-scale image subunit, and classifying the optical vegetative index for the small-scale image subunit relative to the average optical vegetative index for the large-scale cropping system land unit at the same time series element; (d) determining for the time series a variability parameter of the optical vegetative index for the large-scale cropping system land unit over time; (e) determining for each small-scale image subunit having the crop plants for the time series the variability parameter of the optical vegetative index for the small-scale image subunit over time, and classifying the optical vegetative index variability parameter for the small-scale image subunit relative to the optical vegetative index variability parameter for the large-scale cropping system land unit. In some refinements, the small-scale image subunits can represent individual image pixels at the smallest resolution of a digital image. In other refinements, the small-scale image subunits can represent collections of image pixels at a desired intermediate resolution of a digital image. In some refinements, the canopy saturation time point can represent a time or time range in the growth season where a leaf canopy of the crop plants (e.g., such as soybean and/or corn) essentially cover the entire land where they are growing. In some refinements, the determination of the average OVI excludes small-scale image subunits without the crop plants (such as without either of soybean or corn) thereon, such as a forested area, an area with plants other than the specific crop plants of interest (e.g., whether an agricultural crop or otherwise), an urban area, etc. The average OVI can be an arithmetic average of the small-sale image subunits when they have substantially the same areas. In other cases, the average OVI can be an area-weighted average of the small-sale image subunits when they have substantially different areas. In various refinements, the optical vegetative index (OVI) for the small-scale image subunit can be the value the OVI of a single pixel that represents the small-scale image subunit, or it can be an average value from a plurality of pixels that represent the small-scale image subunit. In some refinements, the determination of the OVI time series variability parameter corresponds to a determination of the standard deviation based on the population of average OVI values for the large-scale cropping system land unit at each time series element in the time series (e.g., which average values are determined excluding the non-crop plant areas therein). Alternatively or additionally, other statistical measures for the OVI time series variability parameter can include range, the interquartile range (IQR), and variance. In some refinements, the determination of the standard deviation or other variance parameter is based on the population of OVI values for the small-scale image subunit at each time series element in the time series.

In an embodiment, the method for mapping temporal and spatial stability of a cropping system further comprises (f) representing (i) the relative optical vegetative index and (ii) the relative optical vegetative index variability parameter for the small-scale image subunits as a spatial map over the large-scale cropping system land unit. In a refinement, the relative OVI and/or the relative OVI variability parameter can be represented as a digital map in an electronic medium, for example stored in a computer storage medium and/or displayed on computer display. Additionally or alternatively, the relative OVI and/or the relative OVI variability parameter can be represented as a physical map printed in a physical medium. Any suitable means can be used to illustrate the relative OVI and/or the relative OVI variability parameter, for example color-coded contours, line contours, grey-scale contours etc. that represent the two parameters in combination.

In an embodiment, the method for mapping temporal and spatial stability of a cropping system further comprises (f) implementing a crop management plan action for a portion of the large-scale cropping system land unit based on one or more of (i) the optical vegetative index for the small-scale image subunits corresponding to the large-scale cropping system land unit portion relative to the average optical vegetative index for the large-scale cropping system land unit and (ii) the optical vegetative index variability parameter for the small-scale image subunits corresponding to the large-scale cropping system land unit portion relative to the optical vegetative index variability parameter for the large-scale cropping system land unit. Examples of various crop management plan actions include selection of a different crop management plan for the portion (or a subset of the whole) of the large-scale cropping system land unit based on whether the portion has a relatively high or low OVI relative to the average of the large-scale land unit and/or a relatively stable or unstable OVI relative to the variability of the large-scale land unit. In a refinement, the crop management plan action implemented for the large-scale cropping system land unit portion (i) comprises one or more of crop plant species, crop plant cultivar, tilling plan, pest management schedule, pest management chemicals, irrigation amount, irrigation schedule, fertilization amount, fertilization type, fertilization schedule, planting time, and harvest time, and (ii) is selected to be different from a corresponding crop management plan action implemented in the large-scale cropping system land unit outside of the portion (e.g., selection of different crop plant species for planting inside vs. outside of the portion, selection of pest management, irrigation, and/or fertilization activities inside vs. outside of the portion, etc., and then performing the selected action in the corresponding portions). In another refinement, (A) the crop management plan action implemented for the large-scale cropping system land unit portion is selected from the group consisting of (i) growing a plant other than soybean or corn on the portion (e.g., a different agricultural crop such as alfalfa, an energy/biofuel crop such as miscanthus or switchgrass), (ii) not planting any plant on the portion (e.g., leave the land portion fallow for a selected time or indefinitely), (iii) eliminate or reduce one or more of irrigation, fertilization, and pest management activities relative to those outside the portion (e.g., when the crop model indicates that the return on such activities is low or zero, but a low- or unstable-yield crop plant is still worthwhile to plant), and (iv) increase one or more of irrigation, fertilization, and pest management activities relative to those outside the portion (e.g., when the crop model indicates that the return on such activities is high for the crop plant); and (B) the optical vegetative index for the small-scale image subunits corresponding to the large-scale cropping system land unit portion indicate that the portion has a relatively low land productivity and/or the optical vegetative index variability parameter for the small-scale image subunits corresponding to the large-scale cropping system land unit portion indicate that the portion has a relatively low stability (e.g., relatively low OVI for the land unit portion compared to the average over time and/or relatively unstable OVI for the land unit portion compared to the overall land unit variability). In another refinement, (A) the crop management plan action implemented for the large-scale cropping system land unit portion is selected from the group consisting of (i) growing a soybean or corn cultivar on the portion different from that outside the portion (e.g., a different or higher value soybean or corn cultivar that can provide a higher return on better/more stable land), (ii) eliminate or reduce one or more of irrigation, fertilization, and pest management activities relative to those outside the portion (e.g., when the crop model indicates that the return on such activities is low or zero, and the soybean or corn crop plant will have suitably high yield with less or no management activities), and (iii) increase one or more of irrigation, fertilization, and pest management activities relative to those outside the portion (e.g., when the crop model indicates that the return on such activities is high for the soybean or corn crop plant); and (B) the optical vegetative index for the small-scale image subunits corresponding to the large-scale cropping system land unit portion indicate that the portion has a relatively high land productivity and/or the optical vegetative index variability parameter for the small-scale image subunits corresponding to the large-scale cropping system land unit portion indicate that the portion has a relatively high stability (e.g., relatively low OVI for the land unit portion compared to the average over time and/or relatively unstable OVI for the land unit portion compared to the overall land unit variability).

Various other refinements of the method for mapping temporal and spatial stability of a cropping system are possible.

In a refinement, the canopy saturation time point corresponds to a time at which the crop plants achieve a leaf area index (LAI) of about 3 $m^2$ canopy leaf area/1 $m^2$ underlying group area (e.g., LAI ranging from 2.7-3.3, 2.8-3.2, or 2.9-3.1 $m^2$ canopy leaf area/1 $m^2$ underlying group area; such as where the LAI within the target range is estimated as a time relative to planting for example based on field measurements or other empirical knowledge of the crop plants and their associated climate). In a further refinement, the time corresponding to the canopy saturation time point is within 30 days of the time at which the crop plants achieve an LAI of about 3 $m^2$ canopy leaf area/1 $m^2$ underlying group area (e.g., within +/−1, 2, 5, 10, 20, or 30 days of the reference time for an LAI about 3; variable time window for the canopy saturation time point accounts for availability of image data for the land unit, which could be only periodically available for a given geographic location, such as image about every 5, 10, 15, or 20 days for some satellite imagery).

In another refinement, the canopy saturation time point is about 75 days or about 80 days post-planting of the crop plants (e.g., where planting date can be specified as the actual planting date for the land unit if known or specified according to common practice in the particular geographic region; such as 70-80 days, 75-80 days, or 75-85 days post-planting). In a further refinement, the time corresponding to the canopy saturation time point is within 45-105 days or 50-110 days post-planting of the crop plants (e.g., within +/−1, 2, 5, 10, 20, or 30 days of 70, 75, 80, or 85 days post-planting of the crop plants; variable time window for the canopy saturation time point accounts for availability of image data for the land unit, which could be only periodically available for a given geographic location, such as image about every 5, 10, 15, or 20 days for some satellite imagery).

In another refinement, individual small-scale image subunits at the same time series element can be at the same or different times relative to each other while still corresponding to the same canopy saturation time point for the time series element (e.g., where image data for portions of the large-scale land unit may have been acquired on different days; where certain portions of the large-scale land unit were obstructed by cloud cover on but not others such as where individual small-scale image subunits are selected from an unobstructed image at a time closest to the target canopy saturation time point).

In another refinement, the time series elements represent sequential growing seasons for the crop plants (e.g., sequential growing seasons, which could be yearly or multiple times per year depending on climate and specific crop rotation; growing seasons could be consecutive, but some seasons or years could be omitted if data were not available for the specific season/year or if no crop plants were grown at the specific season/year).

In another refinement, the time series elements represent 5-30 past growing seasons for the crop plants (e.g., growing seasons or years, which can be sequential or consecutive; at least 5, 10, or 15 growing seasons or years and/or up to 10, 15, 20, 25, or 30 growing seasons or years).

In another refinement, the small-scale image subunits represent a spatial resolution ranging from $(0.01\ m)^2$ to $(50\ m)^2$ (e.g., single pixels or groups of pixels in an image for the large-scale land unit). For example, the small-scale image subunits can represent a spatial resolution ranging from $(1\ m)^2$ to $(50\ m)^2$ (e.g., about $(1\ m)^2$ to $(5\ m)^2$, $(3\ m)^2$ to $(10\ m)^2$, $(20\ m)^2$ to $(40\ m)^2$, or $(10\ m)^2$ to $(50\ m)^2$ minimum resolution areas obtainable for example by satellite imagery such as the LANDSAT (about $(30\ m)^2$ resolution), RAPIDEYE (about $(5\ m)^2$ resolution), and WORLDVIEW (about $(1\ m)^2$ resolution) satellite systems). Alternatively, the small-scale image subunits can represent a spatial resolution ranging from $(0.01\ m)^2$ to $(1\ m)^2$ (e.g., about $(0.01\ m)^2$ to $(0.1\ m)^2$ or $(0.1\ m)^2$ to $(1\ m)^2$ minimum resolution areas obtainable for example by aerial imagery such as the drone-based and aircraft-based systems with resolutions of about $(0.01\ m)^2$, $(0.1\ m)^2$, or $(1\ m)^2$).

In another refinement, the large-scale cropping system land unit represents a land area ranging from $5,000\ m^2$ to $5,000,000\ m^2$ (e.g., at least 5,000, 10,000, 20,000, 50,000, 100,000, 200,000; 500,000, or 1,000,000 $m^2$ and/or up to 100,000, 200,000; 500,000, 1,000,000, 2,000,000; or 5,000,000 $m^2$; where 1 acre is $4,047\ m^2$ and 1 hectare is $10,000\ m^2$). For example, the large-scale cropping system land unit can represent a land area of about $2,589,000\ m^2$ (i.e., about 1 square mile). In a further refinement, the large-scale cropping system land unit represents a single cultivated field. In a further refinement, wherein the large-scale cropping system land unit represents a common land unit (CLU) (e.g., a unit of land that has a permanent, contiguous boundary, such as with a common land cover and known land management in terms of crop plant type and rotation, such as having a common owner and a common producer in agricultural land; such as all or a portion of a single common land unit).

In another refinement, there are 5 to 50,000 small-scale image subunits encompassing the large-scale cropping system land unit (e.g., as determined by the total area of the large-scale land unit and the spatial resolution of the small-scale unit). For example, there can be as at least 5, 10, 20, 50, 100, 200, 500, or 1,000 small-scale image subunits and/or up to 500, 1,000, 2,000, 5,000, 10,000, 20,000, or 50,000 encompassing the large-scale cropping system land unit (e.g., where such values are common ranges for a $(30\ m)^2$ small-scale resolution for typical satellite imagery and typical field sizes, with the upper boundary being correspondingly higher for finer small-scale image resolution and/or even larger fields).

In another refinement, the optical vegetative index is a normalized difference vegetative index (NDVI) according to the following formula: $NDVI=(R790-R670)/(R790+R670)$; where R790 is a reflectance value at a wavelength centered at 790 nm and R670 is a reflectance value at a wavelength centered at 670 nm as determined from the small-scale image subunits. More generally, the optical vegetative index can be any of those known in the art that can be determined from reflectance data represented by the images at the small-scale level, for example as disclosed in Cammarano et al., *Remote Sensing*, vol. 6, pp. 2827-2844 (2014) and Cammarano et al., *Agronomy Journal*, vol. 103, pp. 1597-1603 (2011) and incorporated herein by reference in their entireties. Particular OVIs of interest include the enhanced vegetation index (EVI), modified chlorophyll absorption ratio index (MCARI), modified chlorophyll absorption ratio index improved (MCARI2), modified red edge normalized difference vegetation index (MRENDVI), modified red edge simple ratio (MRESR), modified triangular vegetation index (MTVI), modified triangular vegetation index-improved (MTVI2), red edge normalized difference vegetation index (RENDVI), red edge position index (REPI), transformed chlorophyll absorption reflectance index (TCARI), triangular vegetation index (TVI), Vogelmann red edge index 1 (VREI1), and Vogelmann red edge index 2 (VREI2), for example as defined in the foregoing articles and as described in more detail below.

In another refinement, part (c) of the stability mapping method comprises classifying the optical vegetative index for each small-scale image subunit having the crop plants as high or low relative to the average optical vegetative index for the large-scale cropping system land unit at the same time series element.

In another refinement, part (b) of the stability mapping method comprises determining a cumulative distribution of the optical vegetative index for the large-scale cropping system land unit based on the small-scale image subunits therein at the time series element and having the crop plants thereon; and part (c) comprises classifying the optical vegetative index for each small-scale image subunit having the crop plants according to the cumulative distribution of the optical vegetative index for the large-scale cropping system land unit at the same time series element (e.g., as being associated with a particular cumulative distribution value (such as between 0 and 1) or within a histogram/percentile range according to the cumulative distribution).

In another refinement, part (e) of the stability mapping method comprises classifying the optical vegetative index variability parameter for each small-scale image subunit as relatively stable when the optical vegetative index variability parameter for the small-scale image subunit is less than that of the large-scale cropping system land unit, or as relatively unstable when the optical vegetative index variability parameter for the small-scale image subunit is greater than that of the large-scale cropping system land unit (e.g., stable or unstable when the local standard deviation of the optical vegetative index is less than or greater than the global standard deviation of the optical vegetative index for the large-scale cropping system land unit as a whole).

Sustainability Mapping.

In one embodiment, the disclosure relates to a method for mapping temporal and spatial sustainability of a cropping system, the method comprising: (a) determining using a crop model two or more dependent cropping system parameters for one or more crop plants growing on a large-scale cropping system land unit over a plurality of time series elements and for a plurality of small-scale land subunits within the large-scale land unit; (b) determining a distribution of each crop system parameter based on the plurality of time series elements and the plurality of small-scale land subunits; (c) assigning a sustainability score for each crop system parameter in the plurality of time series elements and the plurality of small-scale land subunits based on a ranking of the crop system parameter relative to the distribution for the crop system parameter over all time series elements and all small-scale land subunits; (d) determining a sustainability index as a weighted combination (e.g., average or weighted average) of the sustainability score for each of the crop system parameters at each time series element and each small-scale land subunit. In some refinements, the dependent cropping system parameters can represent dependent variable output from a crop model for one or more crop plants growing on the large-scale land unit (e.g., as compared to specified or otherwise selectable independent crop model variables such as weather or a selectable crop management plan parameter). The dependent cropping system parameters generally can relate to one or more of crop productivity, soil resource management, and environmental impact. In various refinements, the crop model can be calibrated using any available known and/or estimated current and/or historical data for the large-scale land unit, such as related to actual weather, actual crop yields, soil data, etc. (e.g., where such calibration process can apply regardless of whether the time series elements of interest are historical or future). In some refinements, the distribution of each crop system parameter can be a discrete or histogram representation of the distribution, or a continuous representation of the distribution based on discrete/histogram crop model data. In various refinements, the distribution can be a cumulative (or percentile) distribution or a probability density function. In various refinements, the distribution can be time- and/or area-weighted depending on the relative time between successive time series elements and the relative area of the small-scale land subunits. In some refinements, the sustainability score can be an objective ranking of the crop system parameter such as unitless score between selected low and high values corresponding to the crop system parameter's position in its distribution, where a low sustainability score represents undesirable value of the crop system parameter and a high sustainability score represents desirable value of the crop system parameter. Different crop system parameters can be scaled between the same or different low and high sustainability score values, where same low/high limits for different parameters can reflect an even weighting of the different parameters, and different low/high limits for different parameters can reflect a selected uneven weighting of the different parameters. The sustainability score can be a discrete or continuous function of the crop system parameter distribution, such as a discretely distributed specific sustainability score corresponding to selected histogram or percentile brackets of the (cumulative) distribution or a continuous sustainability score as a function of a continuous (cumulative) distribution.

In an embodiment, the method for mapping temporal and spatial sustainability of a cropping system further comprises (e) representing the sustainability index for the small-scale land subunits as a spatial map over the large-scale land unit at a selected time series element. For example, the spatial map can be represented as a digital map in an electronic medium, for example stored in a computer storage medium and/or displayed on computer display. Alternatively or additionally, the spatial map can be represented as a physical map printed in a physical medium; any suitable means to illustrate the sustainability index. Multiple maps at a plurality of different time series elements can be prepared to represent the temporal variation of the local sustainability index at different regions of the large-scale land unit.

In an embodiment, the method for mapping temporal and spatial sustainability of a cropping system further comprises (e) determining an average sustainability index for the large-scale land unit based on an average of the sustainability index for the small-scale land subunits for each time series element. For example, the average sustainability index for the large-scale land unit as a whole over time can represent the temporal variation of large-scale land unit sustainability.

In an embodiment, the method for mapping temporal and spatial sustainability of a cropping system further comprises (e) implementing a crop management plan action for a portion or all of the large-scale cropping system land unit based on the sustainability index for the small-scale land subunits individually or in aggregate for the portion or all of the large-scale cropping system land unit. For example, the crop management plan action can include selection of a different, future crop management plan relative to past or present practice for the portion or the whole large-scale cropping system land unit based on whether the crop model indicates that the change will increase or at least maintain the current sustainability index, such as while increasing or at least maintaining the current economic productivity of the large scale land unit.

In a refinement, the two or more dependent cropping system parameters are selected from the group consisting of crop yield, nitrogen use efficiency ("NUE"), water use efficiency ("WUE"), surface water runoff (or just "runoff"), nitrate leaching (or just "leaching"), soil organic carbon change (or "C % change"), carbon dioxide emission, nitrous oxide emission, and combinations thereof (e.g., as separate cropping system parameters selected for separate determination and incorporation into the sustainability index determination). Descriptions of the foregoing parameters (e.g., in terms of crop model outputs) are provided below.

In another refinement, the crop system parameter distribution is a discrete cumulative distribution with two or more histogram bins spanning the distribution (e.g., separate percentile ranges spanning 0-100 percentile) each with a corresponding sustainability score (e.g., percentile ranges of 0-25, 26-50, 51-75, 76-100 with corresponding scores of 1, 1.333, 1.667, 2 or 2, 1.667, 1.333, 1 respectively, depending whether lowest percentile bracket represents an undesirable value or a desirable value for the crop system parameter, respectively).

In another refinement, the time series elements represent sequential growing seasons for crop plants grown or to be grown on the large-scale land unit. For example, sequential growing seasons could be yearly or multiple times per year depending on climate and specific crop rotation. Growing seasons could be consecutive, but some seasons or years could be omitted if data were not available for the specific season/year or if no crop plants were grown at the specific season/year. Crop system parameters can be determined at one or more consistent time points during the growing season for a time series element, such as at the end of the growing season/harvest.

In another refinement, the time series elements represent 5-30 past growing seasons for crop plants grown on the large-scale land unit (e.g., growing seasons or years, which can be sequential or consecutive; at least 2, 5, 10, or 15 growing seasons or years and/or up to 10, 15, 20, 25, or 30 growing seasons or years).

In another refinement, the time series elements represent 5-30 future growing seasons for crop plants to be grown on the large-scale land unit (e.g., growing seasons or years, which can be sequential or consecutive; at least 2, 5, 10, or 15 growing seasons or years and/or up to 10, 15, 20, 25, or 30 growing seasons or years).

In another refinement, the time series elements represent 5-30 past and future growing seasons for crop plants grown and to be grown on the large-scale land unit (e.g., growing seasons or years, which can be sequential or consecutive, and which span at least some past growing seasons and at least some future growing seasons; at least 2, 5, 10, or 15 past or future growing seasons or years and/or up to 10, 15, 20, 25, or 30 past or future growing seasons or years).

In another refinement, the small-scale land subunits represent a spatial resolution ranging from $(0.01 \text{ m})^2$ to $(50 \text{ m})^2$ (e.g., crop model computational areas, which can be selected based on a corresponding spatial resolution for available comparison data, such as in-field yield data, remote sensing imagery data, etc.). For example, the small-scale land subunits can represent a spatial resolution ranging from $(1 \text{ m})^2$ to $(50 \text{ m})^2$ (e.g., about $(1 \text{ m})^2$ to $(5 \text{ m})^2$, $(3 \text{ m})^2$ to $(10 \text{ m})^2$, $(20 \text{ m})^2$ to $(40 \text{ m})^2$, or $(10 \text{ m})^2$ to $(50 \text{ m})^2$). Alternatively, the small-scale land subunits can represent a spatial resolution ranging from $(0.01 \text{ m})^2$ to $(1 \text{ m})^2$ (e.g., about $(0.01 \text{ m})^2$ to $(0.1 \text{ m})^2$ or $(0.1 \text{ m})^2$ to $(1 \text{ m})^2$).

In another refinement, the large-scale cropping system land unit represents a land area ranging from $5,000 \text{ m}^2$ to $5,000,000 \text{ m}^2$ (e.g., at least 5,000, 10,000, 20,000, 50,000, 100,000, 200,000; 500,000, or 1,000,000 $\text{m}^2$ and/or up to 100,000, 200,000; 500,000, 1,000,000, 2,000,000; or 5,000,000 $\text{m}^2$; where 1 acre is 4,047 $\text{m}^2$ and 1 hectare is 10,000 $\text{m}^2$). For example, the large-scale cropping system land unit can represent a land area of about 2,589,000 $\text{m}^2$ (i.e., about 1 square mile). Alternatively or additionally, the large-scale cropping system land unit can represent a single cultivated field. In a particular refinement, the large-scale cropping system land unit represents a common land unit (CLU) (e.g., a unit of land that has a permanent, contiguous boundary, such as with a common land cover and known land management in terms of crop plant type and rotation, such as having a common owner and a common producer in agricultural land; such as all or a portion of a single common land unit).

In another refinement, there are 5 to 50,000 small-scale land subunits encompassing the large-scale cropping system land unit. For example, as determined by the total area of the large-scale land unit and the spatial resolution of the small-scale unit, there can be at least 5, 10, 20, 50, 100, 200, 500, or 1,000 and/or up to 500, 1,000, 2,000, 5,000, 10,000, 20,000, or 50,000 small-scale land subunits encompassing the large-scale cropping system land unit. The foregoing are common ranges for $(30 \text{ m})^2$ small-scale resolution and common field size, with the upper boundary being correspondingly higher for finer small-scale image resolution and/or larger field/land unit sizes.

Within-Season Stability and Variability Mapping.

In one embodiment, the disclosure relates to a method for mapping temporal and spatial stability of a cropping system within a growing season, the method comprising: (a) providing a plurality of images in a time series, the images (i) spanning a large-scale cropping system land unit having crop plants planted thereon (e.g., at least one of soybean and corn plants; plants can be growing post-emergence thereon), and (ii) comprising a plurality of small-scale image subunits (e.g., individual image pixels at the smallest resolution of a digital image; collections of image pixels at a desired intermediate resolution of a digital image) encompassing the large-scale cropping system land unit; wherein images at a given element in the time series correspond to different time points in a single growth season for the cropping system; (b) determining at a selected time series element (e.g., a time series element prior to application of nitrogen or other fertilizer) a distribution of an optical vegetative index for the large-scale cropping system land unit based on the small-scale image subunits therein at the time selected series element and having the crop plants thereon; (c) segmenting the large-scale cropping system land unit into a plurality of regions based on the distribution of the optical vegetative index for the small-scale image subunits therein at the selected time series element; (d) selecting one or more crop model input parameters specific to each segmented region based on the optical vegetative index for the small-scale image subunits within each segmented region and for each time series element; and (e) determining using a crop model and the selected one or more crop model input parameters specific to each segmented region from part (d) one or more of (i) a crop management plan action for a portion or all of the large-scale cropping system land unit at a future time within the current growth season, and (ii) a dependent cropping system parameter at a future time within the current growth season (e.g., using the crop model to provide improved, in-season predictions using spatially dependent input parameters specific to each segmented region within the large scale land unit). In a refinement, all images in the time series are from the single growing season, where one or more images can be pre-planting of the crop plant, and at least one image is post-planting of the crop plant. In another refinement, the distribution of the optical vegetative index (OVI) can be a discrete or histogram representation of the distribution, or a continuous representation of the distribution based on discrete/histogram crop model data. Alternatively or additionally, the distribution can be a cumulative (or percentile) distribution or a probability density function). Determination of the distribution can exclude small-scale image subunits without the crop plants (such as without either of soybean or corn) thereon, such as a forested area, plants other than the specific crop plants of interest, whether an agricultural crop or otherwise, an urban area, etc. In another refinement, segmentation can be based on a percentile distribution for the OVI across the large scale land unit at the segmentation time series element. For example, the large scale land unit can be segmented into three regions depending on which small-scale image subunits fall into the 0-33, 34-66, and 67-100 percentiles for cumulative OVI distribution, respectively. More or fewer regions can be defined using more or fewer percentile brackets accordingly, which can be evenly or unevenly spaced. The segmentation time series element can be a bare soil image pre-planting, a selected image post-planting but prior to nitrogen/fertilizer application, or any desired image in the time series. In another refinement, the OVI values for all subunits within a given region over the entire time series are used to iteratively select otherwise unknown crop model input parameters (such as any of a variety of soil parameters) to be uniform within, but specific to, the given region such that the crop model output run for the time series better reproduces the measured OVI data via known correlations between crop model outputs related to biomass, etc. and biomass reflectance which determines a calculated OVI for comparison/calibration of the crop model for a specific field and specific growing season. This helps to characterize in-season spatial variability within a large scale field land unit and can be used to improve future crop model predictions and corresponding crop management decisions within a single growing season.

In a refinement, part (e) comprises determining the crop management plan action, and the method further comprises: (f) implementing a crop management plan action for the portion or all of the large-scale cropping system land unit at the future time within the current growth season (e.g., future crop management plan action can be date, location, and/or amount of future nitrogen or fertilizer application, date, location, and/or amount of future irrigation, date, location, and/or amount of future pest management, time of future harvest, etc.).

In another refinement, part (e) comprises determining the dependent cropping system parameter (e.g., crop yield for all or a part of the large scale land unit at a future harvest time).

In another refinement, the plurality of images comprises at least one image of bare soil (e.g., just prior to plant of the crop plant) and at least one image post-planting of the crop plant (e.g., one or more images at emergence, post-emergence, vegetative growth prior to application of nitrogen or other fertilizer, and vegetative growth subsequent to application of nitrogen or other fertilizer).

In another refinement, the small-scale image subunits represent a spatial resolution ranging from $(0.01 \text{ m})^2$ to $(50 \text{ m})^2$ (e.g., single pixels or groups of pixels in an image for the large-scale land unit). For example, the small-scale image subunits can represent a spatial resolution ranging from $(1 \text{ m})^2$ to $(50 \text{ m})^2$ (e.g., about $(1 \text{ m})^2$ to $(5 \text{ m})^2$, $(3 \text{ m})^2$ to $(10 \text{ m})^2$, $(20 \text{ m})^2$ to $(40 \text{ m})^2$, or $(10 \text{ m})^2$ to $(50 \text{ m})^2$ minimum resolution areas obtainable for example by satellite imagery such as the LANDSAT (about $(30 \text{ m})^2$ resolution), RAPIDEYE (about $(5 \text{ m})^2$ resolution), and WORLDVIEW (about $(1 \text{ m})^2$ resolution) satellite systems). Alternatively, the small-scale image subunits can represent a spatial resolution ranging from $(0.01 \text{ m})^2$ to $(1 \text{ m})^2$ (e.g., about $(0.01 \text{ m})^2$ to $(0.1 \text{ m})^2$ or $(0.1 \text{ m})^2$ to $(1 \text{ m})^2$ minimum resolution areas obtainable for example by aerial imagery such as the drone-based and aircraft-based systems with resolutions of about $(0.01 \text{ m})^2$, $(0.1 \text{ m})^2$, or $(1 \text{ m})^2$).

In another refinement, the large-scale cropping system land unit represents a land area ranging from 5,000 m² to 5,000,000 m² (e.g., at least 5,000, 10,000, 20,000, 50,000, 100,000, 200,000; 500,000, or 1,000,000 m² and/or up to 100,000, 200,000; 500,000, 1,000,000, 2,000,000; or 5,000,000 m²; where 1 acre is 4,047 m² and 1 hectare is 10,000 m²). For example, the large-scale cropping system land unit can represent a land area of about 2,589,000 m² (i.e., about 1 square mile). In a further refinement, the large-scale cropping system land unit represents a single cultivated field. In a further refinement, wherein the large-scale cropping system land unit represents a common land unit (CLU) (e.g., a unit of land that has a permanent, contiguous boundary, such as with a common land cover and known land management in terms of crop plant type and rotation, such as having a common owner and a common producer in agricultural land; such as all or a portion of a single common land unit).

In another refinement, there are 5 to 50,000 small-scale image subunits encompassing the large-scale cropping system land unit (e.g., as determined by the total area of the large-scale land unit and the spatial resolution of the small-scale unit). For example, there can be as at least 5, 10, 20, 50, 100, 200, 500, or 1,000 small-scale image subunits and/or up to 500, 1,000, 2,000, 5,000, 10,000, 20,000, or 50,000 encompassing the large-scale cropping system land unit (e.g., where such values are common ranges for a $(30 \text{ m})^2$ small-scale resolution for typical satellite imagery and typical field sizes, with the upper boundary being correspondingly higher for finer small-scale image resolution and/or even larger fields).

While the disclosed compounds, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 8 illustrates a representative sustainability index according to the disclosure including a quartile cumulative distribution and corresponding sustainability scores ranging from 1 to 2.

DETAILED DESCRIPTION

Figure 1:
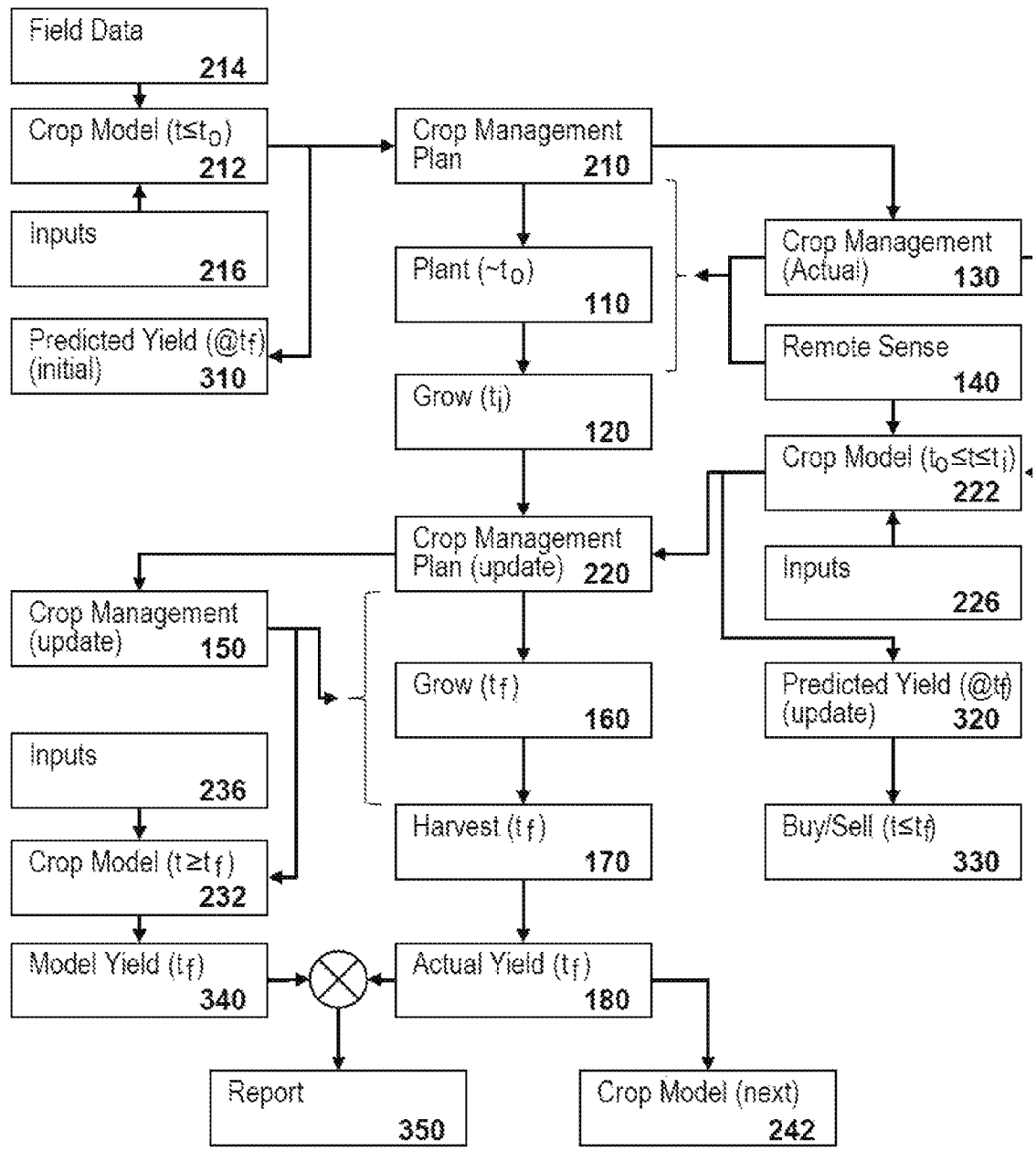
FIG. 1 is a process flow diagram illustrating methods according to the disclosure incorporating precision crop modeling, for example as related to particular methods for growing crop plants and/or managing the growth of crop plants.

In one aspect, the disclosure relates to a method for mapping temporal and spatial stability of a cropping system. The method is designed to quantify the percentage of variability in any corn or soybean field using historical remote sensing images (e.g., across the entire Unites States or other large geographical area). A cloud-free image is chosen every year when the vegetation (e.g., corn or soybean) has full canopy cover with a Leaf Area Index (i.e., the amount of photosynthetic area per unit of area) of approximately 3. Each satellite image is analyzed to estimate the spatial variability and the temporal variance of any corn or soybean fields on a small scale related to the image resolution and a larger scale related to field size (e.g., 1 square mile). The method calculates how much variability is present and what fraction of a field on the larger scale is stable or unstable over time by calculating where the crop growth is consistently higher than the mean of the field (e.g., High Yield and Stable), or consistently lower than the mean of the field (e.g., Low Yield and Stable), or areas that fluctuate over time (e.g., Unstable). The final result is a crop stability map with the percentage of each category (e.g., 60% of the field is High and Stable, 12% is Low and Stable, and 28% is Unstable as an illustrative distribution). The crop stability maps produced using this method have been tested against yield stability maps produced from yield sensors mounted on harvesters. The information obtained from this method is very valuable to different stakeholders (e.g., growers, crop consultants, agriculture/biotech and food supply companies, policy makers), as it shows them the variability present in the fields, the potential inefficient use of resources, and the necessity to manage the observed variability accordingly to increase profit and to use resources efficiency.

In one aspect, the disclosure relates to a method for mapping temporal and spatial sustainability of a cropping system. In an embodiment, a crop-model based sustainability index is a spatial index that ranges from low to high objective, selected values developed to characterize the sustainability of row crops (or other agricultural crop more generally) defined in terms of crop production, economic return and environmental impact. The sustainability index is based on the ranking of site-specific results such as crop yield, nitrogen use efficiency ("NUE"), water use efficiency ("WUE"), surface water runoff (or just "runoff"), nitrate leaching (or just "leaching"), soil organic carbon change (or "C % change"), carbon dioxide emission, and nitrous oxide emission obtained by running a crop model for a long-term time period (e.g., 5 or 10 to 20 or 30 years), to determine the distribution of the different results and to rank with scores the different percentiles (from low to high) of different simulated variables. Each percentile is assigned a score (e.g., 1 being low to represent a poor or undesirable value, 2 being high to represent a good or desirable value). This calculation is done for all the dependent variables incorporated into a given sustainability index definition. For example, a sustainability index $S_{xy}$ at a particular spatial location (x,y) for "n" spatially distributed dependent cropping system parameters $V_{k,xy}$ (e.g., where x, y represent any desired 2-dimensional spatial positions/coordinates for the sustainability index and the cropping system parameters) can be represented as follows:

$$S_{ij} = (1/n) * [V_{1,xy} + V_{2,xy} + V_{3,xy} + \ldots + V_{n,xy}]$$

In a particular embodiment, the sustainability index at a particular spatial location can be represented by the following: S=(⅛)*[crop yield score+nitrogen use efficiency score+ water use efficiency score+surface water runoff score+nitrate leaching score+soil organic carbon change score+ carbon dioxide emission score+nitrous oxide emission score].

Optical Vegetative Indices

A variety of optical vegetative indices are useful in any of the foregoing methods. The optical vegetative index can be any of those known in the art (e.g., as described in the references listed below and incorporated herein by reference) that can be determined from reflectance data represented by optical images of a land area (e.g., crop area or otherwise, such as at the small-scale level such as a small-scale image subunit). In the following definitions, the terms "R[X]" and "ρ[X]" are equivalent and correspond to a measured reflectance value from the optical imagery data at a wavelength centered at "X" nanometers, for example as determined from small-scale image subunits of the optical images. Thus, for example, "R670" and "$\rho_{670}$" equivalently correspond to a reflectance value at a wavelength centered at 670 nm. Representative optical vegetative indices include the normalized difference vegetative index (NDVI), enhanced vegetation index (EVI), modified chlorophyll absorption ratio index (MCARI), modified chlorophyll absorption ratio index improved (MCARI2), modified red edge normalized difference vegetation index (MRENDVI), modified red edge simple ratio (MRESR), modified triangular vegetation index (MTVI), modified triangular vegetation index-improved (MTVI2), red edge normalized difference vegetation index (RENDVI), red edge position index (REPI), transformed chlorophyll absorption reflectance index (TCARI), triangular vegetation index (TVI), Vogelmann red edge index 1 (VREI1), and Vogelmann red edge index 2 (VREI2).

MCARI: This index is one of several CARI indices that indicate the relative abundance of chlorophyll. Daughtry et al. (2000) simplified the CARI index to minimize the combined effects of soil and non-photosynthetic surfaces:

$$MCARI = [(\rho_{700} - \rho_{670}) - 0.2(\rho_{700} - \rho_{550})] * (\rho_{700}/\rho_{670})$$

MCARI2: This index is similar to MCARI but is considered a better predictor of green leaf area index (LAI). It incorporates a soil adjustment factor while preserving sensitivity to LAI and resistance to chlorophyll influence:

$$MCARI2 = \frac{1.5[2.5(\rho_{800} - \rho_{670}) - 1.3(\rho_{800} - \rho_{550})]}{\sqrt{(2*\rho_{800} + 1)^2 - (6*\rho_{800} - 5*\sqrt{\rho_{670}}) - 0.5}}$$

MRENDVI: This index is a modification of the Red Edge NDVI that corrects for leaf specular reflection. It capitalizes on the sensitivity of the vegetation red edge to small changes in canopy foliage content, gap fraction, and senescence. Applications include precision agriculture, forest monitoring, and vegetation stress detection. The value of this index ranges from −1 to 1, and the common range for green vegetation is 0.2 to 0.7:

$$MRENDVI = \frac{\rho_{750} - \rho_{705}}{\rho_{750} + \rho_{705} - 2*\rho_{445}}$$

MRESR: This index is a modification of the broadband simple ratio (SR). It uses bands in the red edge and incorporates a correction for leaf specular reflection. Applications include precision agriculture, forest monitoring, and vegetation stress detection. The value of this index ranges from 0 to 30, and the common range for green vegetation is 2 to 8:

$$MRESR = \frac{\rho_{750} - \rho_{445}}{\rho_{705} - \rho_{445}}$$

MTVI: This index makes TVI suitable for LAI estimations by replacing the 750 nm wavelength with 800 nm, whose reflectance is influenced by changes in leaf and canopy structures:

$$MTVI = 1.2[1.2(\rho_{800} - \rho_{550}) - 2.5(\rho_{670} - \rho_{550})]$$

MTVI2: This index is similar to MTVI but is considered a better predictor of green LAI. It accounts for the background signature of soils while preserving sensitivity to LAI and resistance to the influence of chlorophyll:

$$MTVI2 = \frac{1.5[1.2(\rho_{800} - \rho_{550}) - 2.5(\rho_{670} - \rho_{550})]}{\sqrt{(2*\rho_{800} + 1)^2 - (6*\rho_{800} - 5*\sqrt{\rho_{670}}) - 0.5}}$$

NDVI: This index represents spectral reflectance measurements acquired in the red (visible) and near-infrared regions to assess whether the target area contains live green vegetation or not:

NDVI=(R790−R670)/(R790+R670).

RENDVI: This index is a modification of the traditional broadband NDVI. Applications include precision agriculture, forest monitoring, and vegetation stress detection. This VI differs from the NDVI by using bands along the red edge, instead of the main absorption and reflectance peaks. It capitalizes on the sensitivity of the vegetation red edge to small changes in canopy foliage content, gap fraction, and senescence. The value of this index ranges from −1 to 1, and the common range for green vegetation is 0.2 to 0.9:

$$RENDVI = \frac{\rho_{750} - \rho_{705}}{\rho_{750} + \rho_{705}}$$

REPI: This index is a narrowband reflectance measurement that is sensitive to changes in chlorophyll concentration. Increased chlorophyll concentration broadens the absorption feature and moves the red edge to longer wavelengths. Results are reported as the wavelength of the maximum derivative of reflectance in the vegetation red edge region of the spectrum in microns from 690 nm to 740 nm. The common range for green vegetation is 700 nm to 730 nm. Applications include crop monitoring and yield prediction, ecosystem disturbance detection, photosynthesis modeling, and canopy stress caused by climate and other factors.

TCARI: This index is one of several CARI indices that indicate the relative abundance of chlorophyll. It is affected by the underlying soil reflectance, particularly in vegetation with a low LAI:

$$TCARI = 3\left[(\rho_{700} - \rho_{670}) - 0.2(\rho_{700} - \rho_{550})\left(\frac{\rho_{700}}{\rho_{670}}\right)\right]$$

TVI: This index is calculated as the area of a hypothetical triangle in spectral space that connects (1) green peak reflectance, (2) minimum chlorophyll absorption, and (3) the NIR shoulder. When chlorophyll absorption causes a decrease of red reflectance, and leaf tissue abundance causes an increase in NIR reflectance, the total area of the triangle increases. It is good for estimating green LAI, but its sensitivity to chlorophyll increases with an increase in canopy density:

TVI=0.5[120($\rho_{750}$−$\rho_{550}$)−200($\rho_{670}$−$\rho_{550}$)]

VREI1: This index is a narrowband reflectance measurement that is sensitive to the combined effects of foliage chlorophyll concentration, canopy leaf area, and water content. Applications include vegetation phenology (growth) studies, precision agriculture, and vegetation productivity modeling. The value of this index ranges from 0 to 20, and the common range for green vegetation is 4 to 8:

$$VREI1 = \frac{\rho_{740}}{\rho_{720}}$$

VREI2: This index is a narrowband reflectance measurement that is sensitive to the combined effects of foliage chlorophyll concentration, canopy leaf area, and water content. Applications include vegetation phenology (growth) studies, precision agriculture, and vegetation productivity modeling. The value of this index ranges from 0 to 20, and the common range for green vegetation is 4 to 8:

$$VREI2 = \frac{\rho_{734} - \rho_{747}}{\rho_{715} + \rho_{726}}$$

Cropping System Parameters

A variety of cropping system parameters is useful in any of the foregoing methods, in particular for characterizing sustainability of a cropping system. Cropping system parameters can include those generally known in the art, for example crop yield, nitrogen use efficiency ("NUE"), water use efficiency ("WUE"), nitrogen (N) fertilizer recovery (NFrec), surface water runoff (or just "runoff"), nitrate leaching (or just "leaching"), soil organic carbon change (or "C % change"), carbon dioxide emission, nitrous oxide emission, and combinations thereof (e.g., as separate cropping system parameters selected for separate determination and incorporation into the sustainability index determination).

Crop Yield (or "Yield") is the amount of biomass or grain yield of the crop in mass/area (e.g., kg/ha), which can be measured or determined as a crop model output (dependent variable).

NUE is calculated as follows: NUE=Yield/Napp, where Yield is the crop yield as above and Napp is the is the amount of nitrogen (N) fertilizer applied in mass/area (e.g., kg per hectare; as a crop model selectable input). NUE thus can be determined as a crop model output (dependent variable).

NFE is calculated as follows: NFE=Nup/Napp, where Nup is the crop nitrogen (N) uptake (e.g., as a crop model output (dependent variable)), and Napp is the is the amount of nitrogen (N) fertilizer applied in mass/area as above. NFE thus can be determined as a crop model output (dependent variable).

NFrec is calculated using the difference method, which is the difference between the nitrogen (N) uptake simulated in a given fertilized treatment (Nup, as above) and in the unfertilized treatments (Nup(N0)) also as a crop model output (dependent variable), divided by the amount of nitrogen (N) applied in the given treatment ($\Delta$N): NFrec=Nup/Nup(N0)/$\Delta$N. NFrec thus can be determined as a crop model output (dependent variable).

WUE is calculated as follows: NUE=Yield/Wuse, where Yield is the crop yield as above and Wuse is the amount of water used (e.g., height such as mm of water; as a crop model input). WUE (e.g., kg biomass/mm/ha) thus can be determined as a crop model output (dependent variable).

Surface Water Runoff (or "Runoff") is the amount of rainfall (e.g., height such as mm of water) that does not infiltrate in the soil and leave the area (e.g., as a crop model output). Runoff thus can be determined as a crop model output (dependent variable).

Nitrate Leaching (or "Leaching") is the amount of nitrate per area (e.g., kg/ha) lost from the bottom of the soil profile as result of water percolation, which can be determined as a crop model output (dependent variable).

Soil Organic Carbon Change ("SOC" or "C % change") is the change of SOC (e.g., in percent organic carbon) over time. It is calculated by subtracting the initial SOC from the final SOC, which can be determined as a crop model output (dependent variable).

Carbon Dioxide Emission (or "$CO_2$ emission") is the emission of carbon dioxide from the soil as a result of soil organic matter decomposition, which can be determined as a crop model output (dependent variable).

Nitrous Oxide Emission (or "$N_2O$ emission") is the emission of nitrous oxide from the soil as results of denitrification and fertilizer addition, which can be determined as a crop model output (dependent variable).

Precision Crop Modeling and Management Planning

The disclosure relates to methods and related systems for precision crop modeling and management using the same. Precision crop modeling and management can be incorporated into various methods for growing plants (e.g., crop plants or otherwise) and various methods for managing the growth of such plants in a particular field. The disclosure generally relates to methods for mapping temporal and spatial stability and/or sustainability of cropping system using images (e.g., remotely sensed images providing field reflectance information) and/or crop model output in a time series (e.g., over a time period from past growing season(s) and/or over a time period within a current (or single) growing season). The methods can be used for stability and/or sustainability mapping (i) to determine field variability parameters, field sustainability indices, field segmentation regions, etc., (ii) to represent or otherwise generate a spatial map representing stability and/or sustainability parameters/indices/regions, etc., (iii) determining or updating a crop management plan based on the stability and/or sustainability parameters/indices/regions, etc., and/or (iv) implementing a crop management plan action based on the stability and/or sustainability parameters/indices/regions, etc. A crop management plan is determined using a crop model incorporating a variety of inputs (e.g., stability and/or sustainability inputs as determined herein and/or other conventional inputs) and plant-specific material and energy balances to specify one or more grower-controlled management parameters or action. An initial or updated plan for a given field (e.g., reflecting an initial or updated prescription for fertilization, irrigation, and/or other grower-controlled management parameters) can be followed by a grower to increase crop yield and/or optimize one or more other crop or field parameters (e.g., crop quality, field (marginal) net return, etc.). Alternatively or additionally, historical and/or in-season information (e.g., relating to stability, sustainability, or otherwise) can be used in connection with a crop model to predict the end-of-season crop yield (or other crop or field parameters), which can be used to take action related to same, for example including buying or selling crop-related instruments such as insurance, futures, etc.

FIG. 1 is a process flow diagram illustrating methods according to the disclosure incorporating precision crop modeling, for example as related to particular methods for growing crop plants and/or managing the growth of crop plants. FIG. 1 illustrates various steps of an overall planting and growing cycle which incorporates one or more crop modeling steps and incorporates in-season actual weather conditions experienced at a particular field to update crop management strategies and improve one or more crop or field productivity parameters. In various embodiments, a subset of steps from the overall process flow diagram is performed, for example as relating to activity of a given actor in the overall process (e.g., small-, mid-, or large-scale growers, crop modeling service providers, crop insurance providers, crop commodities brokers, etc.).

As illustrated in FIG. 1, an overall planting and growing cycle can begin with determination of a crop management plan 210 prior to planting (e.g., at an initial or planting time $t_o$) using a crop model 212 (e.g., computed at some pre-planting time $t \leq t_o$). Crop models are generally known in the art and are described in more detail below. Generally, a crop model incorporates a variety of plant-, weather-, and field-specific inputs, material balances, and energy balances to compute future plant growth over a period of time (e.g., at multiple points in time spanning a single or multiple growing seasons). The crop model 212 utilizes historical field data 214 (e.g., weather data, yield data, etc.) along with other inputs 216 to compute future plant growth and field state properties, and to determine the crop management plan 210.

The historical field data 214 can include one or both of historical weather data and historical yield data for the field being modeled to which the crop management plan 210 applies. The historical weather data and historical yield data can be used to initialize the crop model 212, for example before determining the initial crop management plan 210, initial predicted yield 310, etc. for the forthcoming growing season. Initialization of the crop model 212 for a given field ensures that the field state properties (e.g., soil physical properties, soil chemical constituents and soil thermal characteristics, as described below, such as a function of location or constant across the field, depending on the particular property) determined as representing the field at a time prior to planting are as accurate as possible. Accurate, pre-planting initial field state properties increase the ability of the crop model 212 to provide an accurate initial predicted yield 310 and an initial crop management plan 210 which is more likely to optimize one or more crop or field parameters at harvest (e.g., yield or otherwise).

Weather data can include (i) incident solar radiation, (ii) maximum and minimum temperature, and/or (iii) rainfall (or precipitation). In many embodiments, all three weather quantities are used and they are provided on a daily basis or in daily increments (e.g., daily incident solar radiation, daily maximum temperature and daily minimum temperature; and daily rainfall). Other weather data and/or timescales may be used as appropriate depending on the available data and the crop model used. For example, for crop models using computational timescales of other than one day, solar radiation, temperature, and rainfall profiles as a function of time (e.g., values measured at time intervals less than one day) may be used in addition to or as an alternative to the daily integral or maximum/minimum values.

Historical weather data can represent any weather data quantity for any period of time prior to the current growing season. For example, the period can represent at least 1, 2, 3, 4, 5, 7, 10, 20, or 30 years and/or up to 2, 4, 6, 8, 10, 20, 30, 40, or 50 years of historical weather data. Suitably, the historical data spans the period immediately prior to the current growing season and extends backward over a continuous time span. However, any timeframe can be used based on data availability (e.g., a discontinuous time span can be used when historical data is unavailable for some reason). The weather dataset for the field can be derived from meteorological data taken in the vicinity of the field, such as within 1, 2, 5, 10, 20, 50, or 100 km of the field. For example, a meteorological data station can be located on site at the field being modeled. In other embodiments, the meteorological data station gathering and reporting weather data could be up to about 100 km away from the field being modeled and still be reasonably representative of the historical weather data actually experienced by the field.

The historical yield data for the field includes data from the actual field being modeled. Similarly to the historical weather data, the historical yield data can represent at least 1, 2, 3, 4, 5, 7, 10, 20, or 30 years and/or up to 2, 4, 6, 8, 10, 20, 30, 40, or 50 years of historical yield data (e.g., the same timeframe as that for the historical weather data used). Suitably, the historical data spans the period immediately prior to the current growing season and extends backward over a continuous time span. However, any timeframe can be used based on data availability (e.g., a discontinuous time span can be used when historical data is unavailable for some reason). For example, complete historical weather data might be available for an entire selected historical period, but corresponding yield data might be available for only a portion of the selected historical period. In such case, the crop model, in combination with complete historical weather information and partial historical yield information can be used to simulate the missing yield periods (e.g., with knowledge of what plant was planted during the missing yield periods).

The historical yield data can be based on the same crop plant/cultivar to be planted during the upcoming growing season, it can be based on a different crop plant/cultivar, or it can be based on a combination of different crop plants/cultivars (e.g., where one plant or cultivar is the same as that to be planted). The historical weather and yield data is used to (i) initialize crop model parameters which are crop-independent (e.g., soil parameters) and (ii) identify relative stability and/or productivity zones which may be loosely crop-dependent or crop-independent, so different historical plants/cultivars are suitable for the historical yield data. For example, yield and/or stability zone boundaries within a field can be determined based on one crop and then applied to different crops being modeled (e.g., identify zones using historical corn yield data and then use the crop model going forward to model a wheat crop). In a preferred approach, however, yield and/or stability zone boundaries within a field are determined based on the crop of interest to be planted in the upcoming growing season.

Figure 2A:
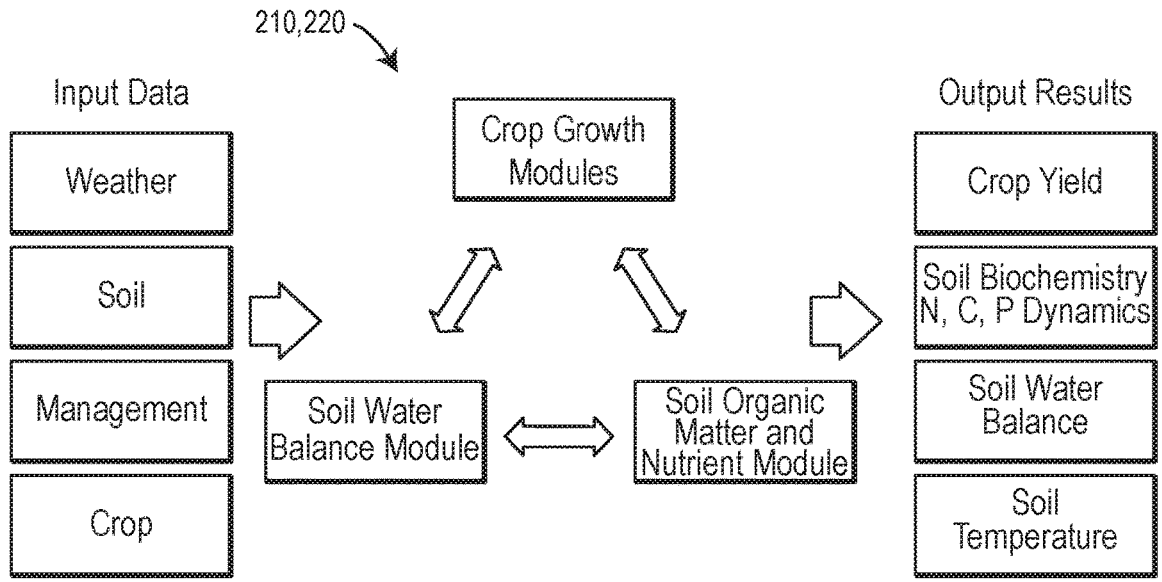
FIGS. 2A, 2B, and 2C are flow diagrams illustrating inputs and outputs to crop models according to the disclosure, such as for use in the general processes illustrated in FIG. 1.
Figure 2B:
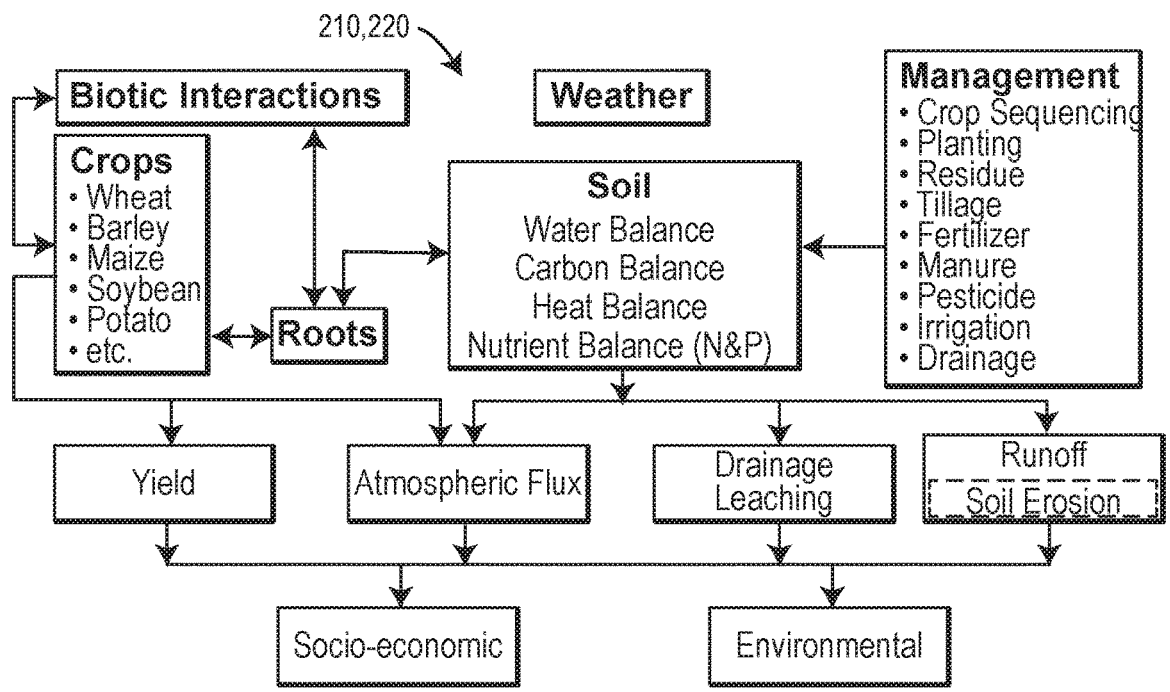
Figure 2C:
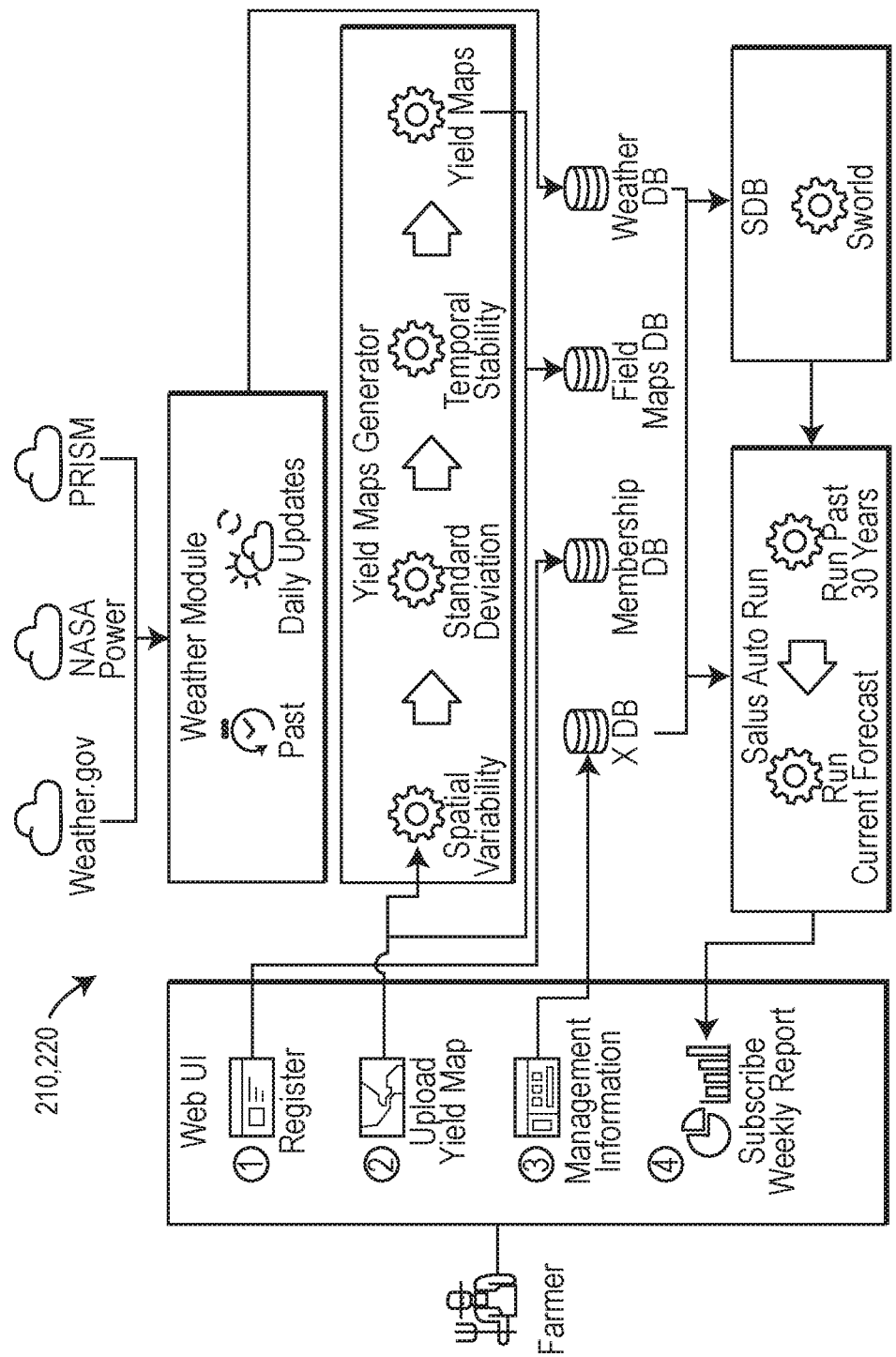

Other inputs 216 to the crop model 212 can include one or more grower-controlled management parameters and/or grower-independent parameters. Such parameters are illustrated in FIGS. 2A-2C in more detail, which illustrate common crop model inputs and outputs according to the disclosure. The grower-controlled management parameters represent crop model inputs that can be arbitrarily selected according to the actions of the grower who will eventually plant and oversee the growth of the crop (e.g., actions for the field as a whole or as a spatially dependent parameter). Examples of grower-controlled management parameters include crop plant species, crop plant cultivar, tilling plan (e.g., whether to till, timing and depth of same if applicable), pest management schedule (e.g., timing, frequency, etc.), pest management chemicals (e.g., one or more herbicides, one or more pesticides, combinations thereof, etc.), irrigation amount (e.g., volume or mass per unit field area), irrigation schedule (e.g., timing, frequency, etc.), fertilization amount (e.g., volume or mass per unit field area), fertilization type (e.g., chemical species), fertilization schedule (e.g., timing, frequency, etc.), planting time (e.g., planned time/date $t_o$ to plant crop), and harvest time (e.g., planned time/date $t_f$ to harvest grown crop). The grower-independent parameters represent crop model inputs that characterize field properties (e.g., for the field as a whole or as a spatially dependent parameter) that generally are not changed (or cannot be changed) by the actions of the grower who will eventually plant and oversee the growth of the crop. Examples of grower-independent parameters include soil type, soil depth, soil chemical constituents (e.g., water content, carbon content, nitrogen content, phosphorous content), soil thermal characteristics (e.g., soil temperature).

Outputs from the crop model 212 include final field state properties (e.g., field state at the end of the modeled time period, such as at a final time $t_f$ for (planned) crop harvest), for example as illustrated in FIGS. 2A-2C, as well as the crop management plan 210.

The final field state properties can include final soil chemical constituents (e.g., water content, carbon content, nitrogen content, phosphorous content after growing or other time period), soil thermal characteristics (e.g., soil temperature after growing or other time period). The final field state properties can further include net biomass/crop growth (e.g., for the field as a whole and/or as a position-dependent value throughout the field), which can correspond to crop yield (e.g., when determined at the final time $t_f$ for harvest) as well as other yield- or growth-based values (e.g., field- or position-dependent gross or net profit, based on (estimated) crop sale price and (estimated) operating costs). The final field state properties can further include losses from the field and/or sources to the external environment relative to the modeled field domain, for example including atmospheric flux of one or more of gaseous species to the external environment (e.g., greenhouse gas emission such as $N_2O$ and/or $CO_2$ flux, loss of gaseous water), drainage or leaching of one or more soil chemical species or nutrients (e.g., nitrogen and/or phosphorous leaching from soil), and runoff or soil erosion (e.g., loss of soil, resulting in a shallower soil depth for the next growing season).

The crop management plan 210 corresponds to a selection or prescription of actions to be implemented by the grower initially upon planting and/or subsequently during growing midseason, and they generally correspond to the grower-controlled management parameters that are implemented by the grower. Examples of grower-controlled management parameters include crop plant species, crop plant cultivar, tilling plan (e.g., whether to till, timing and depth of same if applicable), pest management schedule (e.g., timing, frequency, etc.), pest management chemicals (e.g., one or more herbicides, one or more pesticides, combinations thereof, etc.), irrigation amount (e.g., volume or mass per unit field area), irrigation schedule (e.g., timing, frequency, etc.), fertilization amount (e.g., volume or mass per unit field area), fertilization type (e.g., chemical species), fertilization schedule (e.g., timing, frequency, etc.), planting time (e.g., planned time/date $t_o$ to plant crop), and harvest time (e.g., planned time/date $t_f$ to harvest grown crop). Actions that are performed initially or at an initial time $t_o$ (e.g., tilling, planting, initial fertilization, etc.) are generally performed on or before the planting date (e.g., relative to the physical planting event) as part of the initial crop management activities. More generally, some initial activities could be post-planting in various embodiments, but they can be performed prior to an intermediate time $t_i$ (described below) when the crop management plan is updated. The actual timeframe for specific management actions can be location- or field-specific. For instance, tillage and/or initial fertilizer application can be performed in the fall, or in the spring, which can roughly coincide with a corresponding planting event, or which can be well in advance of the corresponding planting event (e.g., fall post-harvest tillage in preparation for a planting event in the following spring). Specific planting time/date depends on the crop, location and the hemisphere (southern or northern). As an illustrative example, a typical situation for corn grown in the U.S. Midwest is that tillage, planting, and initial fertilization are done in late April all on the same day or within 1-2 days of each other, and the particular schedule for a field can be an element of the crop management plan 210.

The grower-controlled management parameters can be the same as or a subset of the corresponding parameters serving as the inputs 216 to the crop model 212. The crop management plan 210 is provided by the crop model 212 by optimizing one or more of the field state properties resulting from the crop model 212 material and/or energy balances. Namely, one or more input management parameters can be varied (e.g., parametrically varied according to known computational techniques) to identify one or more corresponding crop management plan 210 parameters (e.g., as a specific value or action, or a range of values or actions) which result in a preferred field state property (or properties). In some embodiments, the crop management plan 210 is spatially variable for the field, and at least one management parameter in the plan 210 is different for different spatial regions of the field (e.g., different crops planted in different regions, different irrigation plan in different regions, different fertilization plan in different regions, etc.).

In various embodiments, the crop management plan 210 for the field provided by the crop model 212 (e.g., including one or more management parameters to be implemented by the grower) optimizes one or more field state properties (e.g., at the end of the growing season, such as at or after harvest time $t_f$) such as crop plant yield, crop plant quality (e.g., grain quality or protein content), crop plant marginal net return, soil organic content, and environmental pollutant generation. Optimization of a property can include, for example, maximizing a desired property, meeting or exceeding a minimum threshold for a desired property, minimizing an undesired property, being at or below a maximum threshold for an undesired property, maintaining any property in a range, and/or increasing or decreasing a desired or undesired property relative to a baseline or target value. Example desired properties include crop yield and crop net return. Example undesired properties include: environmental pollutant generation such as greenhouse gas emission (e.g., $N_2O$, $CO_2$), nitrogen leaching from soil, soil organic content loss, etc. The optimized parameters can be determined on a whole-field basis or on a portion of the field (e.g., a higher target crop yield in one portion of the field and a relatively lower target crop yield in another portion of the field). If two or more field state properties are being optimized (e.g., two or more properties related to the same field quantity; two or more properties related to the different field quantities), a weighted and/or constrained optimization system can be used by the crop model 212 to determine the crop management plan 210. For example, the crop model 212 can implement a multi-parameter system in which two or more field state properties are optimized with weighting factors reflecting a relative importance of each field property. Alternatively or additionally, the crop model 212 can implement a multi-parameter system in which one or more field state properties are optimized in view of one or more (range or threshold) constraints for one or more other field state properties, where such constraints can represent sustainable agricultural policy, governmental regulation, etc. For example crop yield and/or net return can be maximized while minimizing or staying below nitrogen leaching and/or greenhouse gas emission thresholds.

With reference to FIG. 1, after determination of the crop management plan 210, the plant is planted (step 110) in the field at an initial planting time/date ($t_o$) according to the crop management plan 210. The initial planting time can be specified by the crop management plan 210, although the actual time at which the plant is planted can be within 1, 2, 3, 5, or 7 days of the planned time based on the crop model 212 output. The plant planted in the field can include a single plant or two or more different plants (e.g., different species or cultivars of plants in different regions of the field). In various embodiments, the plant is a crop plant such as corn or maize, wheat, soybean, oats, barley, rice, sorghum, one or more cultivars thereof, and combinations thereof. Other crop plants include annuals (e.g., trees and/or shrubs, such as in a nursery setting), perennials (e.g. horticultural plants or other crops such as tomatoes, potatoes, sunflowers, etc.), vines, olive trees, and other specialty crops (e.g., cherry, apples, pecan, etc.). Many known crop models are well developed for the prominent cereal crops (e.g., corn, wheat, oats) and other prominent food crops (e.g., soybean), but such existing models can be adapted using known modeling techniques to apply to better represent different crops (e.g., by tuning existing models and/or adding relevant terms to existing models for specific plants). After the plant is planted in the field at the initial planting time/date ($t_o$), the plant is further grown (step 120) until an intermediate time ($t_i$) between the initial time ($t_o$) and a planned final time ($t_f$) for harvesting the plant (e.g., where the planned final harvest time is a crop management plan 210 parameter).

As further illustrated in FIG. 1, crop management activities are performed by the grower (step 130) at one or more points in time, including before planting 110, at planting 110, and/or after planting 110/while growing 120 and before the intermediate time ($t_i$). The crop management activities 130 can be performed at single points in time (e.g., tilling, planting, early season fertilizer application) or at multiple points in time (e.g., periodic irrigation), depending on the nature of the activity and the crop management plan 210 prescription. Preferably, the crop management activities 130 are performed according to the crop management plan 210 (e.g., activities substantially or completely following prescriptions provided in the crop management plan 210). In some embodiments, however, grower-selected deviations from the initial crop management plan 210 are possible without necessarily having an explicit adjusted plan provided by the crop model. For example, a grower might modify an initial crop management plan 210 parameter based on actual, unexpected events occurring during the growing season (e.g., changing pest management plan based on an unforeseen pest infestation; altering irrigation plan based on an unforeseen precipitation levels) and before determination of an updated crop management plan 220 (described below). In some embodiments, the final harvest time ($t_f$) can be planned based on initial crop model 212 prediction and crop management plan 210, but the actual harvest time can be different based on the updated plan 220 midseason.

As illustrated in FIG. 1, after planting 110 and growing 120 the plant for a period and at a time prior to harvest, an updated crop management plan 220 is determined at the intermediate time ($t_i$) using a crop model 222. The intermediate time ($t_o < t_i < t_f$) at which the updated crop management plan 220 is determined can be at a time which is 0% or 5% to 20%, 20% to 40%, 40% to 60%, 60% to 80%, or 80% to 95% or 100% of the interval between initial planting time and planned harvest time ($t_f - t_o$). Suitably, the intermediate time is in the vicinity of mid-growing season and/or prior to a second application of fertilizer (e.g., in split-application fertilization plan with a first fertilizer application near initial planting and a second fertilizer application during the season). The crop models 212, 222 are generally the same model (e.g., employing the same material and energy balance models with corresponding model constants, etc.), but they differ in terms of input 226 information used to determine the corresponding crop management plans 210, 220. The crop model 212 generally uses projected weather data for the period between the initial planting time and the planned harvest time to determine an initial predicted yield 310 and the corresponding crop management plan 210. In contrast, the crop model 222 uses actual weather data (e.g., actual incident solar radiation, actual maximum and minimum temperature, and/or actual rainfall) as an input 226 for the weather conditions experienced by the field for at least the period between initial planting and the intermediate time (e.g., possibly going back further in time prior to initial planting, such as to the end of the historical weather data used to provide the initial crop management plan 210), and the model 220 uses projected weather data as an additional input 226 for the period between the intermediate time and the planned harvest time to determine an updated predicted yield 320 and other final field state properties at harvest.

The particular source of the projected weather information, whether used in connection with the initial or updated crop management plan 210 or 220, is not particularly limited, but it can represent forecast data for the field (e.g., meteorological forecast available at a time at or before the initial planting time), probabilistic weather data based on historical weather data for the field, and combinations thereof (e.g., multiple selected discrete weather scenarios, weighted combinations of different weather information sources). In some embodiments, multiple future weather scenarios can be used with the crop models 212, 222 to determine corresponding crop management plans 210, 220, predicted yields 310, 320, etc. For example, given a baseline prediction for the projected weather information (e.g., a probable or most probable future weather outcome based on any known weather prediction methods), one or more future weather scenarios departing from the baseline prediction can be used, such as various combinations of (a) baseline value, (b) higher-than-baseline value, and (c) lower-than-baseline value with weather parameters such as (i) incident solar radiation, (ii) maximum and minimum temperature, and (iii) rainfall. Illustrative future weather scenarios include one or more of (1) higher-than-baseline temperature, baseline solar radiation, and baseline rainfall; (2) lower-than-baseline temperature, baseline solar radiation, and baseline rainfall; (3) baseline temperature, baseline solar radiation, and higher-than-baseline rainfall; (4) baseline temperature, baseline solar radiation, and lower-than-baseline rainfall; (5) baseline temperature, higher-than-baseline solar radiation, and baseline rainfall; and (6) baseline temperature, lower-than-baseline solar radiation, and baseline rainfall. Lower and higher relative to a baseline value can represent, for example, at least 0.5° C., 1° C., 2° C., or 3° C. and/or up to 1° C., 2° C., 5° C., or 10° C. hotter or colder than baseline (e.g., for minimum and/or maximum daily temperature), or at least 2%, 5%, 10%, or 20% and/or up to 5%, 10%, 20%, or 50% higher or lower than baseline (e.g., for solar radiation or rainfall).

In an embodiment, the projected weather for the current growing season can be based on the actual historical weather experienced during the corresponding seasonal period of a previous growing season. This approach can be useful when the known weather to date in the current growing season is identified as being substantially similar to the known weather of a particular previous growing season (e.g., similar in terms of incident solar radiation, maximum and minimum temperature, and/or rainfall). As an illustrative example, if it is desirable to project weather information for a field for July-September of 2014 and the actual weather observed for the field from April-June of 2014 (e.g., a current year) is substantially similar to the actual weather observed for the field from April-June of 1988 (e.g., a previous year), then the projected weather for the field for July-September of 2014 can be taken to be the same as the actual weather for the field for July-September of 1988.

Other inputs 226 to the crop model 220 can include one or more grower-controlled management parameters and/or grower-independent parameters as generally described above for the crop model 212. The grower-controlled management parameters for the crop model 220 represent crop model inputs that can be arbitrarily selected according to the actions of the grower that are possible for manipulation or change during the growing season (e.g., a subset of initial inputs 216, since some actions are not applicable midseason, such as plant species/cultivar selection, planting time, tilling plan, etc.). Examples of grower-controlled management parameters include pest management schedule, pest management chemicals, irrigation amount, irrigation schedule, fertilization amount, fertilization type, fertilization schedule, and harvest time. Examples of grower-independent parameters are similar to above and include soil type, soil depth, soil chemical constituents (e.g., water content, carbon content, nitrogen content, phosphorous content), soil thermal characteristics (e.g., soil temperature), whose initial input values for the crop model 220 can be determined from the corresponding output values and final field state properties from the crop model 212.

Another input 226 to the crop model 220 can include the crop management activities 130 performed on the field up to the intermediate time. In some embodiments, the crop management activity 130 input simply represents the prescription provided by the crop management plan 210 (e.g., in the absence of information as to the management activities performed by the grower up to the intermediate time). In other embodiments, the crop management activity 130 input represents the actual management activities performed by the grower up to the intermediate time, for example where the grower confirms adherence to the crop management plan 210, or where the grower provides or otherwise reports actual management activities (e.g., including in-season deviations from the crop management plan 210) to a party performing the crop modeling.

In an embodiment, another input 226 to the crop model 220 can include remotely sensed plant nitrogen data for the field at a point in time between the initial time ($t_o$) and the intermediate time ($t_i$) (e.g., at or within 1, 2, 3, 5, or 7 days of the intermediate time). Remotely sensed nitrogen generally corresponds to an optical measurement of one or more plant indices which correlate to plant nitrogen, canopy nitrogen, etc. (e.g., optical reflectance at one or more characteristic wavelengths corresponding to a given index). Example indices which are known and suitably correlate to various nitrogen contents include the canopy content chlorophyll index (CCCI) and the canopy nitrogen index (CNI), among others, for example as described in Cammarano (2011) and Cammarano (2014). Optical measurements can be aerial optical measurements, for example as remotely detected from the air by a unmanned aerial vehicle (UAV) or other aircraft equipped with suitable optical detection equipment (e.g., capable of making rapid optical measurement at field-relevant spatial scales, such as with a resolution at 100 m², 25 m², 4 m², or 1 m² or less, which spatial scales similarly can represent computational scales of the crop models). Nitrogen content, as determined by remote sensing, is known to correlate to plant biomass (e.g., and ultimately plant yield at the end of the growing season). The nitrogen content may be sensed by the grower, a party performing the crop modeling for the grower, or otherwise.

In some embodiments, remotely sensed nitrogen provides a crop model 222 validation point, because it essentially provides an in-season instantaneous measurement of plant yield (e.g., current biomass) at a given point in time (e.g., at a time at or before the intermediate time), which yield can be compared to the yield predicted by the crop model. In some refinements, this in-season yield measurement can be used as an input to refine future model calculations and yield predictions in the growing season. In other refinements, the in-season yield measurement is not used as an input for future model calculations and yield predictions during the season, but provides additional confidence regarding the accuracy of the crop model predictions (e.g., when the crop model yield and the measured yield based on remote nitrogen sensing substantially match at the time of remote sensing).

In some embodiments, remotely sensed nitrogen can indicate that some unexpected event has occurred that is outside of the crop model prediction capabilities. In this case, the remotely sensed nitrogen data and its corresponding biomass values can be used to take corrective action (e.g., in the updated management plan 220) and/or to reset the crop model 220 predictions for the remaining growing season. For example, lower-than-expected plant yield measures by remote sensing (e.g., as compared to the crop model 220 prediction) in a certain region of a field might indicate a localized pest problem damaging crops in the region. In this case, the updated crop management plan 220 could include a more aggressive pest management plan in the region (e.g., additional or more frequent pesticide or herbicide spraying), and the crop model 222 biomass values in the region can be reset according to the measurement to reflect low yields and/or plant damage for remainder of season in the region. Examples of other unplanned, extra-model events that similarly can be detected via remote sensing and accommodated by the updated crop management plan 220 and/or crop model 222 include animals (e.g., deer or other wild animals) trampling and damaging or destroying a portion of the field, a hailstorm, tornado, or other extreme weather event damaging or destroying a portion of the field. With such extreme events, the damaged or destroyed field region can be modeled as non-producing or low-producing for the remainder of the growing season to improve the net field yield prediction at the end of the season.

As above for the crop model 212, outputs from the crop model 222 include final field state properties (e.g., field state as described above at the end of the modeled time period, such as at a final time $t_f$ for (planned) crop harvest), as well as the updated crop management plan 220. The updated crop management plan 220 corresponds to a selection or prescription of actions to be implemented by the grower after the initial time and prior to harvest, and they generally correspond to the grower-controlled management parameters that are implemented by the grower during this period. Examples of grower-controlled management parameters include pest management schedule (e.g., when remote nitrogen sensing or other information source indicates plant damage or other need for additional pest management), pest management chemicals, irrigation amount, irrigation schedule, fertilization amount, fertilization type, fertilization schedule, and harvest time. Also similar to the crop model 212, the grower-controlled management parameters can be the same as or a subset of the corresponding parameters serving as the inputs 130, 226 to the crop model 222. The updated crop management plan 220 is provided by the crop model 222 by optimizing one or more of the field state properties resulting from the crop model 222 material and/or energy balances. In some embodiments, the updated crop management plan 220 is spatially variable for the field, and at least one management parameter in the plan 220 is different for different spatial regions of the field. In various embodiments, the updated crop management plan 220 optimizes one or more field state properties (e.g., at the end of the growing season, such as at or after harvest time $t_f$) such as crop plant yield, crop plant quality, crop plant marginal net return, soil organic content, and environmental pollutant generation as described above. The same or different optimization criteria can be used for the crop management plan 210 and the updated crop management plan 220.

In an embodiment, at least one crop management item is different in the updated crop management plan 220 relative to the corresponding crop management item from the initial crop management plan 210. This reflects a situation where the updated plan 220 changes at least one management strategy from the initial plan 210, for example as a result of actual weather experienced during the growth season which was substantially different from the projected weather used to generate the initial crop management plan 210. This similarly can apply to consecutive updated management plans (described below). In other cases, however, it is possible the updated crop management plan 220 re-confirms that the initial plan 210 (or previous updated plan) is still a preferred plan to meet target optimization criteria, for example with a greater level of confidence based on the accumulation of in-season data growth and/or actual weather data.

In an embodiment, the initial crop management plan 210 includes at least one fertilization management item (e.g., a fertilization amount, a fertilization type, fertilization location, a fertilization schedule) and the updated crop management plan 220 includes at least one updated fertilization management item (e.g., an updated fertilization amount, an updated fertilization type, an updated fertilization location, an updated fertilization schedule) relative to the crop management plan 210. For example, a common fertilization management strategy includes a split-application plan for a fertilizer such as a nitrogen-containing fertilizer. In a split application plan, (i) an initial fertilizer amount (e.g., 30% of planned total) and fertilizer type and (ii) a subsequent planned midseason fertilizer amount (e.g., 70% of planned total), fertilizer type, fertilizer location, and planned fertilization time are specified in the initial crop management plan 210. The grower then can perform the initial portion of the split-application plan, for example applying the initial fertilizer amount according to the initial plan 210 at or near the initial planting time. When the updated crop management plan 220 is determined at the intermediate time using actual weather data, the updated plan 220 can specify a (iii) subsequent midseason fertilizer amount (e.g., possibly near to or far from originally planned subsequent amount and total fertilizer, fertilizer type, fertilizer location, and planned fertilization time, any or all of which can be different from the corresponding fertilization management item in the initial plan 210. The grower then can perform the subsequent portion of the split-application plan according to the updated plan 220.

In many cases, one or more fertilization items from initial crop management plan 210 will benefit by at least some updating during the season, which is reflected in the updated crop management plan 220. In some refinements, the fertilization management plan can include one or more of a spatially dependent timing of application, amount of application, and number of applications. In many cases the initial and updated fertilization management plan are 2-application plans, but the timing and/or amount of second (subsequent) fertilization event could vary between plans. In other cases, it is possible that updated plan is a 1-application plan (e.g., indicating that no further fertilization during the season is desirable, for example for some region or all of the field) or a 3- (or more) application plan (e.g., indicating that more than one additional fertilization event during the season is desirable). Because some degree of fertilization management plan update is often desirable, determination of multiple updated crop management plans 220 during a given season can be desirable.

In an embodiment, the initial crop management plan 210 includes at least one irrigation management item (e.g., an irrigation amount, an irrigation schedule), and the updated crop management plan 220 includes at least one updated irrigation management item (e.g., an updated irrigation amount, an updated irrigation schedule) relative to the initial plan 210. This embodiment can be applicable if the field has water available for irrigation. In some areas, irrigation water is readily available, but growers do not irrigate regularly because the field generally receives sufficient rain. In such areas, the updated crop management plan 220 can indicate whether additional secondary irrigation is desirable and/or economical. For example, a cost-benefit analysis provided by the crop model 222 could indicate that easily accessible secondary irrigation (e.g., via a field-located well or otherwise) could increase yield and/or return, even if not needed to avoid plant damage due to seasonal drought conditions.

As further illustrated in FIG. 1, after the updated crop management plan 220 is determined, the plant is further grown (step 160), for example until about the planned final time ($t_f$) for harvesting the plant (e.g., where the planned final harvest time is an updated crop management plan 220 parameter). Updated crop management activities are performed by the grower (step 150) at one or more points in time, for example up to and including the harvest time (e.g., between the intermediate time ($t_i$) and the final time ($t_f$)), although in some embodiments the updated plan 220 and corresponding activities 150 can be extended post-harvest (e.g., post-harvest tillage or fertilizer (or other chemical) application in preparation for the next growing season, which could be months away). As above, the updated crop management activities 150 can be performed at single points in time (e.g., plant harvest; mid- or late-season fertilizer application, such as a second or subsequent application in a split-application fertilization plan) or at multiple points in time (e.g., periodic irrigation), depending on the nature of the activity and the updated crop management plan 220 prescription. Preferably, the updated crop management activities 150 are performed according to the updated crop management plan 220 (e.g., activities substantially or completely following prescriptions provided in the updated plan 220). In some embodiments, however, grower-selected deviations from the updated crop management plan 220 are possible without necessarily having an explicit adjusted plan provided by the crop model.

As illustrated in FIG. 1, the plant can be further grown (step 160) according to the updated crop management activities 150 until plant harvest (e.g., at or about planned final time ($t_f$)). In some embodiments, the crop plant can be further grown (step 160) according to the updated crop management plan 220 until a new updated crop management plan is determined at a new intermediate time ($t_i^{NEW}$) before plant harvest (e.g., where the new intermediate time ($t_i^{NEW}$) is after the intermediate time ($t_i$) and before the final time ($t_f$)). The new updated crop management plan suitably is followed until itself is further updated or until the end of the growing season, but grower deviations subsequent to the updated crop management plan are possible. For example, although FIG. 1 illustrates a feedback loop including a single crop modeling-updated crop management plan-updated crop management activity cycle during a single plant-grow-harvest season, a more general method of plant growth or plant management according to the disclosure can include repeating the feedback loop with improved crop model accuracy (e.g., based on in-season actual weather information and/or other in-season information) to provide a plurality of updated crop management plans 220($j$) at a plurality of intermediate times ($t_i^{(j)}$). For example, updated management plans 220(1), 220(2), 220(3), . . . 220($n$) can be determined at times $t_o<t_i^{(1)}<t_i^{(2)}<t_i^{(3)}< . . . <t_i^{(n)}<t_f$ during a single season. Each updated crop management plan 220($j$) can be determined using actual weather data up to intermediate times $t_i^{(j)}$, projected weather data afterward, as well as previously performed crop management activities and other inputs as described above for the updated crop management plans 220. The frequency of the updated plans 220($j$) (or time between consecutive plans 220($j$)) can be the same or different, such as at least 1, 2, 3, 5, 7, 10, or 14 days and/or up to 2, 3, 5, 7, 10, 14, 21, 28, 30, 42, 56, or 60 days, and/or at intervals equal to any of the foregoing periods (e.g., daily, bi-weekly, weekly, semi-weekly, monthly).

As illustrated in FIG. 1, after growing 160 the plant according to the updated crop management plan 220 (e.g., performing the crop management activities 150 substantially or completely following prescriptions provided in the updated plan 220), the plant is harvested at or about the planned final time ($t_f$), for example where the planned final time is a crop management parameter specified in the initial crop management plan 210, the updated crop management plan 220, or both. The actual final time at which the plant is harvested need not be identical to the planned final time. For example, the actual final time for harvest could be within 1, 2, 5, 7, 10, 14, or 21 days relative to the planned final time for harvest (e.g., from the initial plan 210), whether based on the updated crop management plan 220 midseason and/or other decisions by the grower outside of the management plan/model predictions.

As illustrated in FIG. 1 and described above, an initial predicted yield 310 (e.g., determined at a time prior to planting) and an updated predicted yield 320 (e.g., determined at a time between planting and harvest) can be determined using the crop models 212, 214 in combination with historical weather data, in-season actual weather data, and in-season projected weather data as well as other inputs (e.g., crop management plans 210, 220 and/or actual crop management activities 130, 150).

In an embodiment, the grower can buy and/or sell (step 330) prior to harvest one or more crop- or plant-related financial instruments (e.g., crop futures, crop insurance) based on the updated predicted yield 320, for example in relation to the initial predicted yield 310 (or an earlier-in-time updated predicted yield 320 determined from an updated crop model at an earlier time during the season). For example, crop futures could be initially sold by a grower near or prior to planting based on the predicted yield 310 of the initial crop management plan 210 (e.g., a predicted yield amount corresponding to a particular confidence level from the initial crop management plan 210, such as a 50%, 75%, 90%, 95% predicted likelihood that the eventual field yield will be at or above a threshold level). Relative to this action, the updated yield prediction 320 could allow the grower to take appropriate midseason action prior to harvest, for example: (i) selling additional futures if the midseason yield prediction 320 is above the initial yield prediction 310 or an already-sold amount of futures, for example based on the same or different confidence level, or (ii) purchasing additional futures to cover a potential shortfall if the midseason yield prediction 320 prediction is below the initial yield prediction 310 or an already-sold amount of futures, for example based on the same or different confidence level. Analogous activity also is possible based on a comparison of at least two different updated predicted yields 320 determined at different points in time (e.g., selling additional futures when a newer updated yield prediction 320 is above an older updated yield prediction 320, purchasing additional futures when a newer updated yield prediction 320 is below an older updated yield prediction 320). Alternatively, crop insurance could be initially purchased by a grower near or prior to planting based on the predicted yield 310 of the initial crop management plan 210 (e.g., a predicted yield amount corresponding to a particular confidence level from the initial crop management plan 210, such as a 50%, 75%, 90%, 95% predicted likelihood that the eventual field yield will be at or above a threshold level). Relative to this action, the updated yield prediction 320 could allow the grower to take appropriate midseason action prior to harvest, for example purchasing additional crop insurance (e.g., from a private insurer) to cover a potential shortfall if the midseason yield prediction 320 prediction indicates a likelihood that the level of initially purchased crop insurance will be insufficient to cover end-of-season losses.

In another embodiment, an insurer can sell (step 330) crop insurance for one or more plants in the field according to an insurance parameter determined using at least one of the initial predicted yield 310 and the updated predicted yield 320. Example insurance parameters include insurance cost (e.g., premium, deductible), insurance basis (e.g., crop yield, crop income), specific events insured against damage (e.g., any event causing damage or yield loss, pest damage, weather-related loss such as drought), etc. In an embodiment, field-specific crop-yield (or crop-income) insurance can be sold, for example where the yield expectation (or corresponding income expectation based on current market value or other economic indicia) for a given field that is used to determine the cost of insurance and/or the level at which an insurance claim may be made includes input from the crop model 212 and/or 222 prediction, such as the predicted yield 310 and/or 320. The insurance could be sold pre-season (e.g., prior to planting, such as based on the crop model 212 and the initial predicted yield 310). Additionally or alternatively, the insurance could be sold mid-season (e.g., at or after the intermediate time when the updated predicted yield 320 is determined from the crop model 222). In a refinement, the insurance, whether sold pre- or mid-season, can be spatially variable. For example, the yield threshold for an insurance claim can be lower in a part of a field that is predicted to be low yielding in the current season, and the yield threshold can be higher in another part of a field that is predicted to be high yielding in the current season. In some embodiments, the determination of the updated predicted yield 320 and sale of a corresponding mid-season crop insurance product can be performed in response to a specific request from a grower (e.g., a mid-season, on-demand insurance product in which specific insurance parameters of the crop insurance product are determined using the crop model 222 with up-to-current mid-season weather, such as also with a specification and/or certification by the grower regarding any actual crop management activities 130, 150 to date).

In another embodiment, the initial predicted yield 310 and the updated predicted yield 320 can be determined using the crop models 212, 222 (e.g., using the various historical, actual, and projected weather and other inputs above) for multiple different fields, for example fields within the same geographical region. The predicted yields 310, 320 for each field can be determined independently from each other (e.g., using crop models 212, 222 and management plans 210, 220 specific to each field). The scope of the geographical region is not particularly limited, for example corresponding to a single state or province, two or more (adjacent) states or provinces (e.g., constituting an entire country or entire adjacent countries), a sub-region of a single state or province, etc. For example, the geographical region can include fields within a 10 km, 20 km, 50 km, 100 km, 200 km, 500 km, or 1000 km radius of a central location in the region. In some embodiments, all agricultural fields in the region can be included in the yield predictions. In other embodiments, only agricultural fields in the region growing a specific plant, two or more specific plants, or one or more cultivars thereof are included in the yield predictions. Based on the aggregate predicted yields, crop futures for the crop plant(s) to be grown or being grown on the field can be bought and/or sold (step 330) by a party (e.g., the grower, a service provider generating crop management plans for one or more growers in the region, a commodities broker), for example based on initial predicted yield 310 and/or based on a comparison between the updated and initial predicted yields 310, 320 (e.g., where the updated yield is higher or lower yield than originally predicted, for example as described above).

After or during harvesting 170 of the plant, the actual yield 180 of the plant can be measured. The actual yield can represent the net yield for the field as a whole. Suitably, however, the actual yield is measured as a function of location on the field (e.g., local actual yield per unit area as a function of position), for example using any conventional harvesting apparatus (e.g., combine harvester or otherwise) including a means for measuring and reporting position (e.g., global positioning system (GPS) receiver or otherwise to measure and report current position) and a means for measuring and reporting plant amount harvested (e.g., on-board scale or otherwise to measure and report current amount or mass of crop plant harvested, which can be correlated to current position). The actual yield is generally measured by the grower after or during harvest. The actual yield value then can be provided (e.g., by the grower) to any third party of interest, such as a crop modeling or crop management service, an insurer, a governmental or other regulatory body, or any other party to whom the grower has an obligation to report actual yield. The actual yield can be used, for example, to confirm crop model state at the end of growing season and/or to re-initialize a crop model 242 for the next growing season using one additional year of yield and weather data.

In an embodiment, one or more compliance parameters can be evaluated for the harvested plant using a crop model 232, the actual yield 180 for the crop plant, and the actual weather for the growing season. The compliance parameters can be evaluated by the grower or by any third party of interest to whom the actual yield is reported, such as a crop modeling or crop management service, an insurer, or a governmental or other regulatory body. A compliance parameter can include an environmental-based limitation, which can be a governmental or regulatory requirement, or a contractual obligation of the grower. For example, a grower might be limited in terms of maximum fertilizer applied to a field, maximum irrigation applied to a field, maximum nutrient leaching (e.g., nitrogen, phosphorous) from a field, maximum greenhouse gas emission (e.g., $N_2O$, $CO_2$) from a field, and/or maximum pesticide or herbicide application to a field. Given the actual weather for the growing season as an input 236 to the crop model 232, the crop model 232 can determine a model yield 340 along with other inputs 236 as generally described above for the crop models 212, 222, and including the crop management activities for the past season (e.g., crop management activities 130, 150 as reported by the grower and/or activities according to any crop management plans 210, 220 determined during the growing season). A comparison between the model yield 340 and the actual yield 180, for example in the form of a report 350 (e.g., provided to or generated by the third party of interest), can indicate whether the grower substantially followed any crop management plans 210, 220 determined during the growing season and/or met any requirement(s) associated with the compliance parameter. For example, when the actual yield 180 is within about 5%, 10%, 20%, 30%, or 50% of the model yield 340 (e.g., expressed on a whole-field basis or based on one or more sub-regions of the field), it can be inferred that the grower substantially followed the crop management plans 210, 220 determined during the growing season and satisfied any compliance parameters, which were included as optimization constraints for the crop models 212, 222 to determine the corresponding plans 210, 220. In a refinement, the specific value of the any compliance parameters for the growing season can be determined and/or reported the third party of interest (e.g., determination both that a nutrient leaching value for the field was below a maximum allowable level and the specific value of the nutrient leaching parameter for the field). Conversely, when the actual yield 180 is substantially different from the model 340 (e.g., outside any of the foregoing ranges), it can be inferred that the grower substantially deviated from the crop management plans 210, 220 determined during the growing season and may have violated one or more compliance parameters. Specific possible compliance parameter violations can be evaluated using the crop model 232 with possible compliance parameter violations as alternative inputs 236 to evaluate which compliance parameters were violated. As an illustration, if the actual yield 180 is twice the model yield 340 (i.e., 100% higher) for a given season, it can be inferred that the grower substantially deviated from the crop management plans 210, 220, for example by applying more nitrogen fertilizer than permitted and/or generating higher $N_2O$ emissions than permitted (e.g., as a result of over-fertilization). In such case, reevaluating the crop model 232 with alternate fertilization management plans can identify (i) what actual nitrogen fertilization level would have been required to achieve the measured actual yield 180 and (ii) what $N_2O$ emission level corresponds to the fertilization level. If the actual nitrogen fertilization and/or the $N_2O$ emission level exceed any corresponding compliance parameters for the values, the grower may be subject to sanctions for violation (e.g., regulatory fines, contract damages, or other disciplinary action).

Crop Model

Crop models are generally known in the art. Generally, a crop model incorporates a variety of plant-, weather-, and field-specific inputs, material balances, and energy balances to compute future plant growth in a field as well as the next flux of material and energy into or out of the field over a period of time (e.g., a single or multiple growing seasons). In an embodiment, the crop model can be incorporated into a crop modeling/crop management system, for example in including a general purpose computer adapted to receive the plant-, weather-, and field-specific inputs (e.g., via user input, from a transient or persistent computer storage medium, remotely via an internet or other network connection). The computer can include a processor to execute the various material balances, energy balances, and predicted plant growth determinations, for example to execute the various process steps described above with respect to the crop model (e.g., as generally illustrated in FIG. 1, such as receiving various inputs and generating corresponding outputs related to the crop models 212, 222, and 232). The computer can further include memory, for example including a transient computer storage medium (e.g., random access memory (RAM)) to store computer-readable instructions for the processor to execute the various process steps described above (e.g., including any of the various crop growth, material balance, energy balance, and other modules described herein) and/or a persistent computer storage medium (e.g., hard drive, solid state drive, flash memory) to store the computer-readable instructions for the processor and/or crop model simulation data (e.g., input data, output data including crop management plans, etc.).

The crop model can be used to evaluate the sustainability of various land and crop management strategies with indicators such as (i) crop productivity, (ii) socioeconomic and ecological well being, and (iii) resource availability. The crop model can help improve land management for sustainable crop production by reducing chemical inputs (e.g., fertilizer application), increasing resource use efficiency (e.g., increased yield, reduced fertilization cost, reduced irrigation cost), enhanced nutrient cycling, and integrated pest management. Model inputs can include long-term crop, soil, and weather data (e.g., measurements of crop yields, soil properties, biogeochemical fluxes).

The following provides a description of the Systems Approach for Land Use Sustainability (SALUS) crop model for evaluating the impact of agronomic management on crop yields, carbon (C) and nitrogen (N) dynamics, and environmental performance. The SALUS model is described by way of illustration, but other crop models known in the art also may be used, for example including CROPGRO for major grain legumes, CERES for cereal crops, and SUBSTOR for crops with belowground storage organs, all of which are available in the Decision Support System for Agrotechnology Transfer (DSSAT) suite of crop models used to simulate crop biomass and yield as influenced by weather, soil, crop management, and crop genotype.

The Systems Approach to Land Use Sustainability (SALUS) (Basso et al. 2006, Basso et al. 2010) is similar to the DSSAT family of models, but further simulates yields of crops in rotation as well as soil, water and nutrient dynamics as a function of management strategies over multiple years. SALUS accounts for the effects of rotations, planting dates, plant populations, irrigation and fertilizer applications, and tillage practices. The model simulates daily plant growth and soil processes on a daily time step during the growing season and fallow periods. SALUS contains (i) crop growth modules, (ii) soil organic matter (SOM) and nutrient cycling modules, and (iii) soil water balance and temperature modules. The model simulates the effects of climate and management on the water balance, SOM, nitrogen (N) and phosphorous (P) dynamics, heat balance, plant growth, and plant development. Within the water balance, surface runoff, infiltration, surface evaporation, saturated and unsaturated soil water flow, drainage, root water uptake, soil evaporation, and transpiration are simulated. Soil organic matter decomposition, along with N mineralization and formation of ammonium and nitrate, N immobilization, and gaseous N losses are also simulated.

Crop development in the SALUS model is based on thermal time calculations modified by daylength and vernalization. Potential crop growth depends on intercepted light using solar radiation data and simulated LAI, and is reduced by water or nitrogen limitations. The main external inputs for the crop growth simulations are the plant genetic coefficients and climate data (e.g., daily solar radiation, precipitation, and air temperature). The SALUS model simulates SOM and N mineralization/immobilization from three soil organic carbon pools (active, slow, and passive) that vary in their turnover rates and characteristic C:N ratios. A soil P model incorporates inorganic P (labile, active, and stable) and organic P dynamics. The soil water balance calculates infiltration, drainage, evaporation, and runoff.

Input data to the SALUS model includes weather, soil and crop management activities, soil properties, genetic characteristics of the crop, and the site location. SALUS accounts for weather variability by using up to several decades of existing weather information to represent a historical weather data period. Daily totals of rainfall and solar radiation along with the maximum and minimum temperature over the historical weather data period provide a relatively accurate crop simulation. Weather data is preferably obtained at a site near the area where the crop model is to be applied, especially for daily rainfall. Temperature and radiation are more spatially uniform, so the weather station need not be on site. Most weather stations record rainfall and temperature but not always solar radiation. Accurate solar radiation data can be obtained from NASA (e.g., directly via an internet connection) with a spatial resolution in 1-degree grid cells. This NASA data source also provides all of the daily weather data input for the SALUS model with the same spatial resolution issues as with solar radiation. Soil input properties include the lower limit of available soil water, the field capacity or drained upper limit (DUL) water content, soil texture, soil bulk density, and soil organic matter content. Irrigation input characteristics include the dates, amounts, and mode of application. The crop variety, genotype, or cultivars also are specified, for example with wheat and corn cultivar information generally being expressed as genetic coefficients, which allow models to simulate crop phenology over a wide range of latitudes and planting times.

Stability and Sustainability Mapping

FIGS. 3A-6B generally illustrate the disclosed methods for mapping temporal and spatial stability and/or sustainability of a cropping system.

Figure 3A:
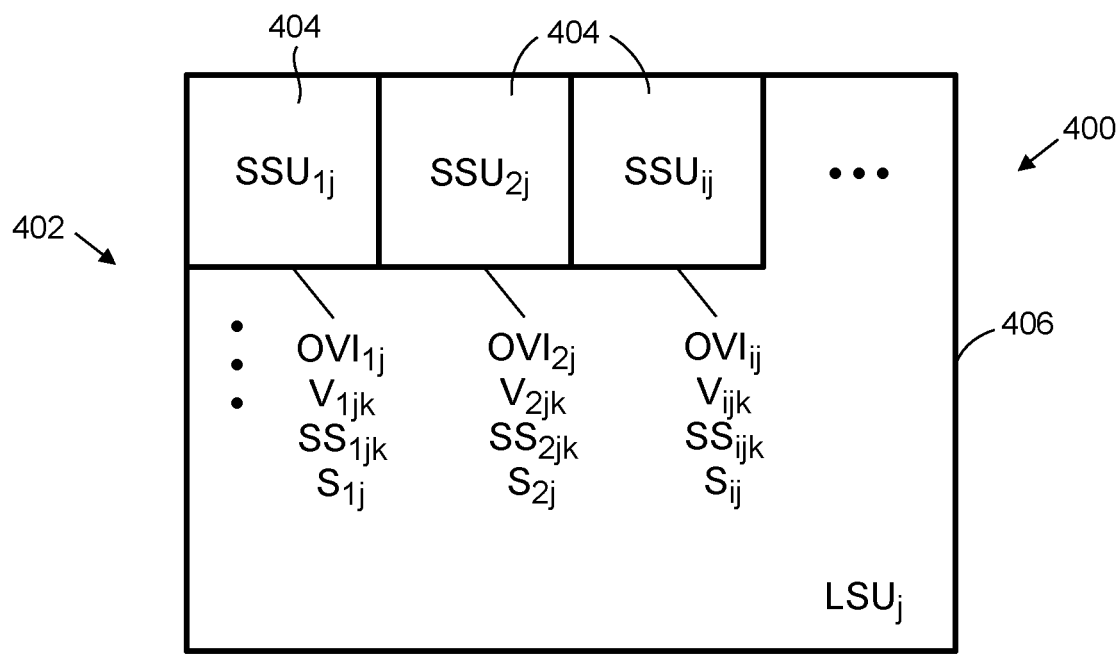
FIGS. 3A and 3B illustrate representative land units which can be the subject of temporal and spatial stability and/or sustainability mapping according to the disclosure.
Figure 3B:
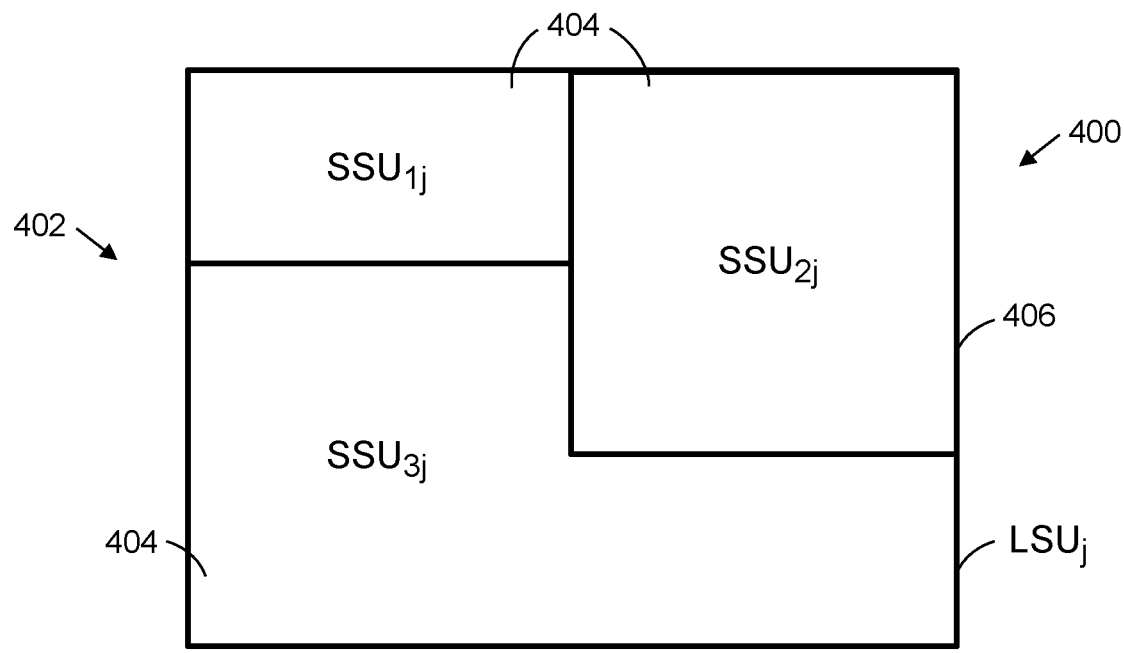

FIGS. 3A and 3B illustrate representative land units 400 which can be the subject of temporal and spatial stability and/or sustainability mapping according to the disclosure. The land unit 400 and its components (e.g., large-scale cropping system land unit, small-scale land/image subunits, etc.) can correspond to the physical land being mapped, or a representation of the physical land being mapped, for example images 402 of the land (or components thereof) or a crop model 212,222 representation of the land (or components thereof). The land unit 400 includes a large-scale cropping system land unit (LSU) 406 and a plurality of small-scale land or image subunits (SSU) 404 encompassing the large-scale cropping system land unit 406.

As particularly illustrated in FIG. 3A, the land unit 400 can be characterized by a plurality of different parameters that can vary spatially and temporally over the land unit 400. Representative parameters include an optical vegetative index (OVI), a dependent cropping system parameter or variable (V), a sustainability score (SS), and a sustainability index (S). As illustrated, a plurality of different values for a given parameter can be represented by an index i, and index j, and/or an index k. The index i is a position indicator (e.g., a single number index as illustrated, a pair of (x,y) or other spatial coordinates, etc.). The index j is a time index (e.g., element number in the time series). The index k is a parameter or variable index, for example to denote multiple crop system parameters/variables (V) or corresponding sustainability scores (SS) (e.g., k=1 corresponds to crop yield as a crop system parameter/variable or sustainability score, k=2 corresponds to nitrogen use efficiency as a crop system parameter/variable or sustainability score, etc.). For example, as illustrated in FIG. 3A, the large-scale cropping system land unit 406 at a point in time $t_j$ is denoted as $LSU_j$, where a plurality of land units $LSU_j$ at different j values/time indices represent temporal variability of the large-scale cropping system land unit 406. Similarly, the small-scale land or image subunits 404 at a point in time $t_j$ and a specific location are denoted as $SSU_{ij}$, where a plurality of land/image subunits $SSU_{ij}$ at (i) different j values/time indices represent temporal variability of the small-scale land or image subunits 404 and at (ii) different i values/position indices represent spatial variability of the small-scale land or image subunits 404. As further illustrated, $OVI_{ij}$, $V_{ijk}$, $SS_{ijk}$, and $S_{ij}$ can vary spatially and/or temporally, and correspond to the optical vegetative index, the cropping system parameter or variable, the sustainability score, and the sustainability index, respectively, associated with the land/image subunit $SSU_{ij}$ at different points in space and time.

Although FIG. 3A illustrates the small-scale land or image subunits 404 as regular, uniformly shaped areas (e.g., rectangles or squares), the small-scale land or image subunits 404 can have any desired, regular or irregular shape. As illustrated in FIG. 3B, for example, the small-scale land or image subunits 404 can have variables sizes and shapes relative to each other.

Figure 4A:
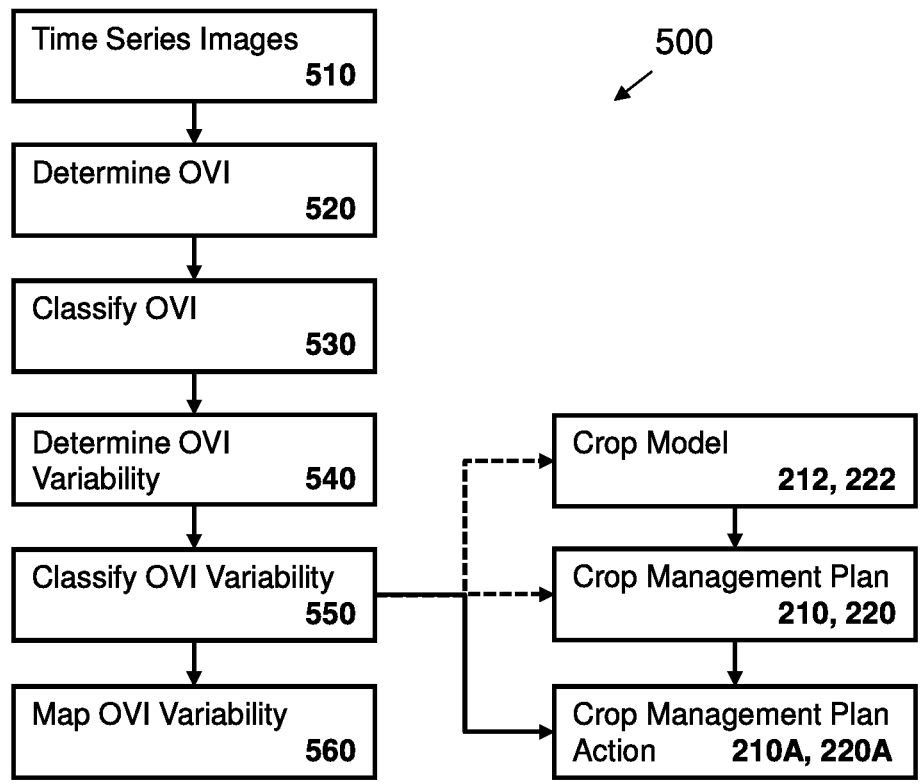
FIG. 4A is a process flow diagram illustrating a method according to the disclosure for mapping temporal and spatial stability of a cropping system.

FIG. 4A is a process flow diagram illustrating a method 500 according to the disclosure for mapping temporal and spatial stability of a cropping system. In an initial step 510, a plurality of images 402 is provided in a time series for example as acquired by satellite imaging, aerial imaging or remote sensing, or other means. The images 402 span the large-scale cropping system land unit 406 (e.g., which has soybean and/or corn crop plants planted thereon, such as growing post-emergence thereon), and include a plurality of small-scale image subunits 404 encompassing the large-scale land unit 406. The images 402 at a given element in the time series $t_j$ correspond to a canopy saturation time point in a growth season for the cropping system (e.g., when the leaf area index is about 3 for a given small-scale image subunit 404).

In another step 520, an average (e.g., mean, median, mode) optical vegetative index (OVI) for the large-scale cropping system land unit 406 is determined at each time series element $t_j$ based on the small-scale image subunits 404 therein (e.g., based on determination of a corresponding plurality of $OVI_{ij}$ values for the subunits 404) at the time series element $t_j$ and having the crop plants thereon. The average OVI can be an arithmetic average of the small-sale image subunits 404 when they have substantially the same areas. In other cases, the average OVI can be an area-weighted average of the small-sale image subunits 404 when they have substantially different areas.

In another step 530, the optical vegetative index for each small-scale image subunit 404 is classified relative to the average optical vegetative index for the large-scale cropping system land unit 406 at the same time series element $t_j$ (e.g., based on a determination of the optical vegetative index for each small-scale image subunit 404 having the crop plants at each time series element $t_j$). For example, the optical vegetative index for each small-scale image subunit 404 having the crop plants can be classified as high or low relative to the average optical vegetative index for the large-scale cropping system land unit 406 at the same time series element $t_j$. In a further refinement, the optical vegetative index for each small-scale image subunit 404 having the crop plants can be classified according to a cumulative distribution of the optical vegetative index for the large-scale cropping system land unit 406 at the same time series element $t_j$ (e.g., as determined in step 520 or otherwise; such as being associated with a particular cumulative distribution value (such as between 0 and 1) or within a histogram/percentile range according to the cumulative distribution).

In another step 540, a variability parameter of the optical vegetative index for the large-scale cropping system land unit 406 over time is determined for the time series Determination of the OVI time series variability parameter can correspond to a determination of the standard deviation based on the population of average OVI values for the large-scale cropping system land unit at each time series element in the time series (e.g., which average values are determined excluding the non-crop plant areas therein). Alternatively or additionally, other statistical measures for the OVI time series variability parameter can include range, the interquartile range (IQR), and variance.

In another step 550, the time series variability parameter of the optical vegetative index over time is determined for each small-scale image subunit 404 having the crop plants, and the optical vegetative index variability parameter for each small-scale image subunit 404 is classified relative to the optical vegetative index variability parameter for the large-scale cropping system land unit 406. For example, the optical vegetative index variability parameter for each small-scale image subunit 404 can be classified as relatively stable when the optical vegetative index variability parameter for the small-scale image subunit 404 is less than that of the large-scale cropping system land unit 406, or as relatively unstable when the optical vegetative index variability parameter for the small-scale image subunit 404 is greater than that of the large-scale cropping system land unit 406 (e.g., stable or unstable when the local standard deviation of the optical vegetative index for the subunit 404 is less than or greater than, respectively, the global standard deviation of the optical vegetative index for the large-scale cropping system land unit 406 as a whole). More refined classification based on to what degree the local variation of the subunit 404 is above or below that of the land unit 406 as a whole is possible, for example being expressed as a continuous or contour value, or being grouped into a discrete number of histogram or percentile groups (e.g., percentile ranges such as 0-25, 26-50, 51-75, and 76-100).

Figure 4B:
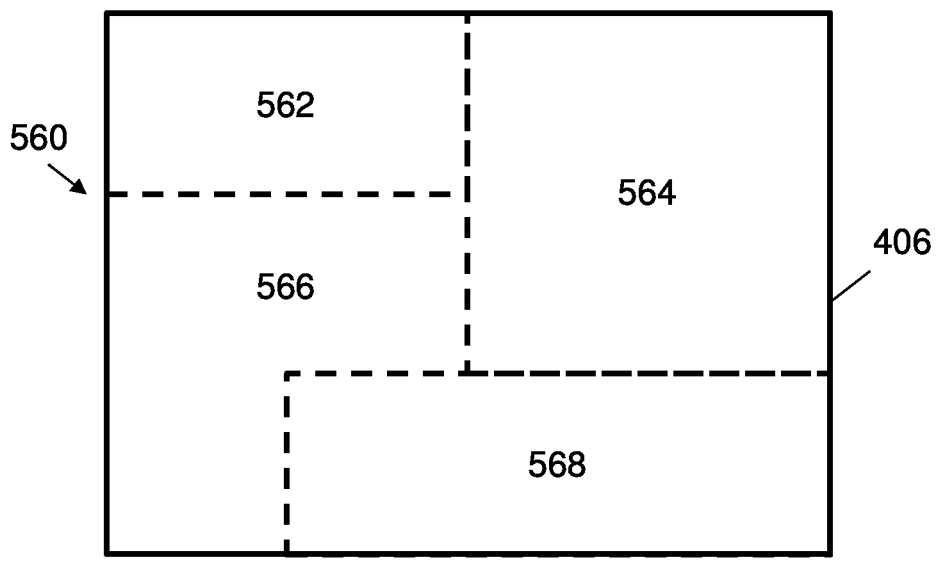
FIG. 4B is an illustrative stability map for a large-scale cropping system land unit resulting from the process of FIG. 4A.

In some embodiments, another step 560 includes representing (i) the relative optical vegetative index (OVI) and (ii) the relative optical vegetative index (OVI) variability parameter for the small-scale image subunits 404 as a spatial map over the large-scale cropping system land unit 406. For example, the relative OVI and/or the relative OVI variability parameter can be represented as a digital map in an electronic medium (e.g., stored in a computer storage medium and/or displayed on computer display). Additionally or alternatively, the relative OVI and/or the relative OVI variability parameter can be represented as a physical map printed in a physical medium. FIG. 4B is an illustrative stability map 560 for a large-scale cropping system land unit 406 resulting from the process 500 of FIG. 4A. The stability map 560 includes four illustrative regions: Region 562 has a high OVI relative to the average OVI of the land unit 406 and a stable (or low) OVI variability relative to the OVI variability of the land unit 406. Region 564 has a low OVI relative to the average OVI of the land unit 406 and a stable (or low) OVI variability relative to the OVI variability of the land unit 406. Region 566 has a high OVI relative to the average OVI of the land unit 406 and an unstable (or high) OVI variability relative to the OVI variability of the land unit 406. Region 568 has a low OVI relative to the average OVI of the land unit 406 and an unstable (or high) OVI variability relative to the OVI variability of the land unit 406.

In some embodiments, results from the process 500 can be used to implement a crop management plan action 210A, 220A for a portion of the large-scale cropping system land unit 406 based on (i) the optical vegetative index for the small-scale image subunits 404 corresponding to the large-scale cropping system land unit 406 portion relative to the average optical vegetative index for the large-scale cropping system land unit 406 and/or (ii) the optical vegetative index variability parameter for the small-scale image subunits 404 corresponding to the large-scale cropping system land unit 406 portion relative to the optical vegetative index variability parameter for the large-scale cropping system land unit 406. In some refinements, the results from the process 500 can be used in a crop model 212, 222 (e.g., as an input thereto) and/or to specify a crop management plan 210, 220 having the action 210A, 220A as a component thereof. As illustrated in the general context of FIG. 1, the results from the process 500 can be incorporated pre- or post-planting (e.g., mid growing season) into crop modeling 212, 222, crop management plan 210, 220 determination, and/or crop management plan action 210A, 220A implementation.

Figure 5A:
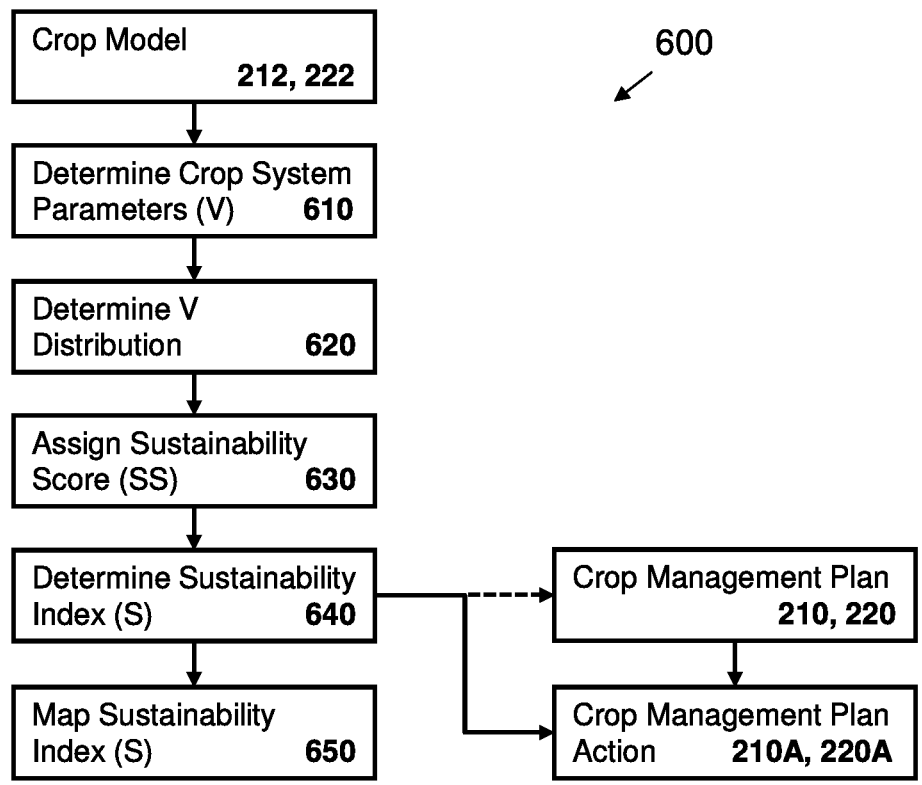
FIG. 5A is a process flow diagram illustrating a method according to the disclosure for mapping temporal and spatial sustainability of a cropping system.

FIG. 5A is a process flow diagram illustrating a method 600 according to the disclosure for mapping temporal and spatial sustainability of a cropping system. In an initial step 610, a crop model 212, 222 is used to determine two or more dependent cropping system parameters for one or more crop plants growing on a large-scale cropping system land unit 406 over a plurality of time series elements $t_j$ and for a plurality of small-scale land subunits 404 within the large-scale land unit 406. In some refinements, the dependent cropping system parameters can represent dependent variable output from a crop model for one or more crop plants growing on the large-scale land unit 406 (e.g., as compared to specified or otherwise selectable independent crop model variables such as weather or a selectable crop management plan parameter). The dependent cropping system parameters generally can relate to one or more of crop productivity, soil resource management, and environmental impact.

In another step 620, a distribution of each crop system parameter is determined based on the plurality of time series elements $t_j$ and the plurality of small-scale land subunits 404. For example, the crop system parameter distribution can be a discrete cumulative distribution with two or more histogram bins spanning the distribution (e.g., separate percentile ranges spanning 0-100 percentile, such as percentile ranges of 0-25, 26-50, 51-75, 76-100).

In another step 630, a sustainability score is assigned for each crop system parameter in the plurality of time series elements $t_j$ and the plurality of small-scale land subunits 404 based on a ranking of the crop system parameter relative to the distribution for the crop system parameter over all time series elements $t_j$ and all small-scale land subunits 404. For example, when the crop system parameter distribution is a discrete cumulative distribution with two or more histogram bins spanning the distribution as above, each histogram bin can have a corresponding sustainability score (e.g., percentile ranges of 0-25, 26-50, 51-75, 76-100 with corresponding scores of 1, 1.333, 1.667, 2 or 2, 1.667, 1.333, 1 respectively, depending whether lowest percentile bracket represents an undesirable value or a desirable value for the crop system parameter, respectively).

In another step 640, a sustainability index is determined as a weighted combination (e.g., average or weighted average) of the sustainability score for each of the crop system parameters at each time series element and each small-scale land subunit 404. In some refinements, the sustainability score can be an objective ranking of the crop system parameter such as unitless score between selected low and high values corresponding to the crop system parameter's position in its distribution, where a low sustainability score represents an undesirable value of the crop system parameter and a high sustainability score represents a desirable value of the crop system parameter. Different crop system parameters can be scaled between the same or different low and high sustainability score values, where same low/high limits for different parameters can reflect an even weighting of the different parameters, and different low/high limits for different parameters can reflect a selected uneven weighting of the different parameters. The sustainability score can be a discrete or continuous function of the crop system parameter distribution, such as a discretely distributed specific sustainability score corresponding to selected histogram or percentile brackets of the (cumulative) distribution or a continuous sustainability score as a function of a continuous (cumulative) distribution.

Figure 5B:
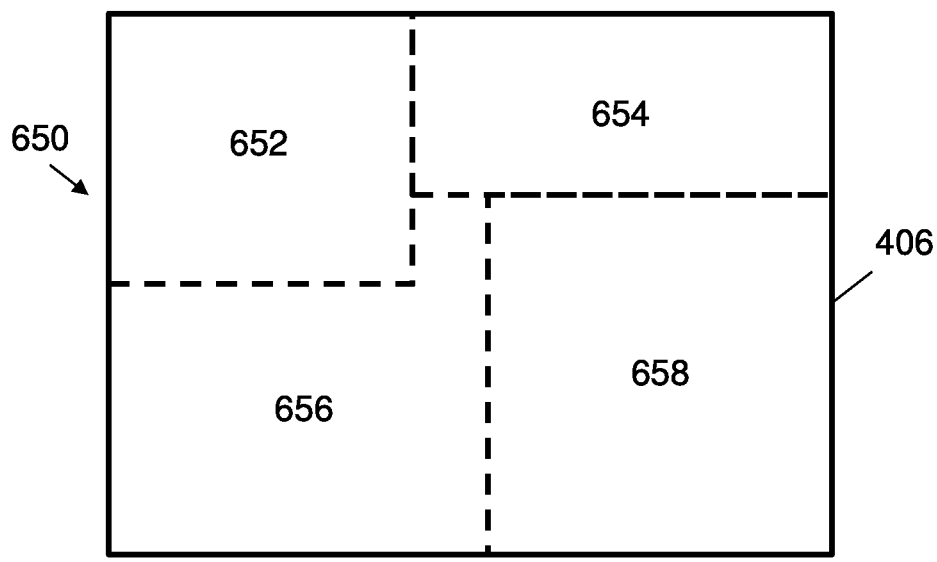
FIG. 5B is an illustrative sustainability map for a large-scale cropping system land unit resulting from the process of FIG. 5A.

In some embodiments, another step 650 includes representing the sustainability index for the small-scale land subunits 404 as a spatial map over the large-scale land unit 406 at a selected time series element $t_j$. For example, the spatial map can be represented as a digital map in an electronic medium, for example stored in a computer storage medium and/or displayed on computer display. Alternatively or additionally, the spatial map can be represented as a physical map printed in a physical medium; any suitable means to illustrate the sustainability index. Multiple maps at a plurality of different time series elements $t_j$ can be prepared to represent the temporal variation of the local sustainability index at different regions of the large-scale land unit 406. FIG. 5B is an illustrative sustainability map 650 for a large-scale cropping system land unit resulting from the process 600 of FIG. 5A. The sustainability map 650 includes four illustrative regions: Region 652 has a sustainability index in a first quartile of the crop system parameter or sustainability score distribution. Region 654 has a sustainability index in a second quartile of the crop system parameter or sustainability score distribution. Region 656 has a sustainability index in a third quartile of the crop system parameter or sustainability score distribution. Region 658 has a sustainability index in a fourth quartile of the crop system parameter or sustainability score distribution.

In some embodiments, results from the process 600 can be used to implement a crop management plan action 210A, 220A for a portion or all of the large-scale cropping system land unit 406 based on the sustainability index for the small-scale land subunits 404 individually or in aggregate for the portion or all of the large-scale cropping system land unit 406. For example, the crop management plan action 210A, 220A can include selection of a different, future crop management plan 210, 220 relative to past or present practice for the portion or the whole large-scale cropping system land unit 406 based on whether the crop model 212, 222 indicates that the change will increase or at least maintain the current sustainability index, such as while increasing or at least maintaining the current economic productivity of the large scale land unit 406. In some refinements, the results from the process 600 can be used in a crop model 212, 222 (e.g., as an input thereto) to specify a crop management plan 210, 220 having the action 210A, 220A as a component thereof. As illustrated in the general context of FIG. 1, the results from the process 600 can be incorporated pre- or post-planting (e.g., mid growing season) into crop modeling 212, 222, crop management plan 210, 220 determination, and/or crop management plan action 210A, 220A implementation.

Figure 6A:
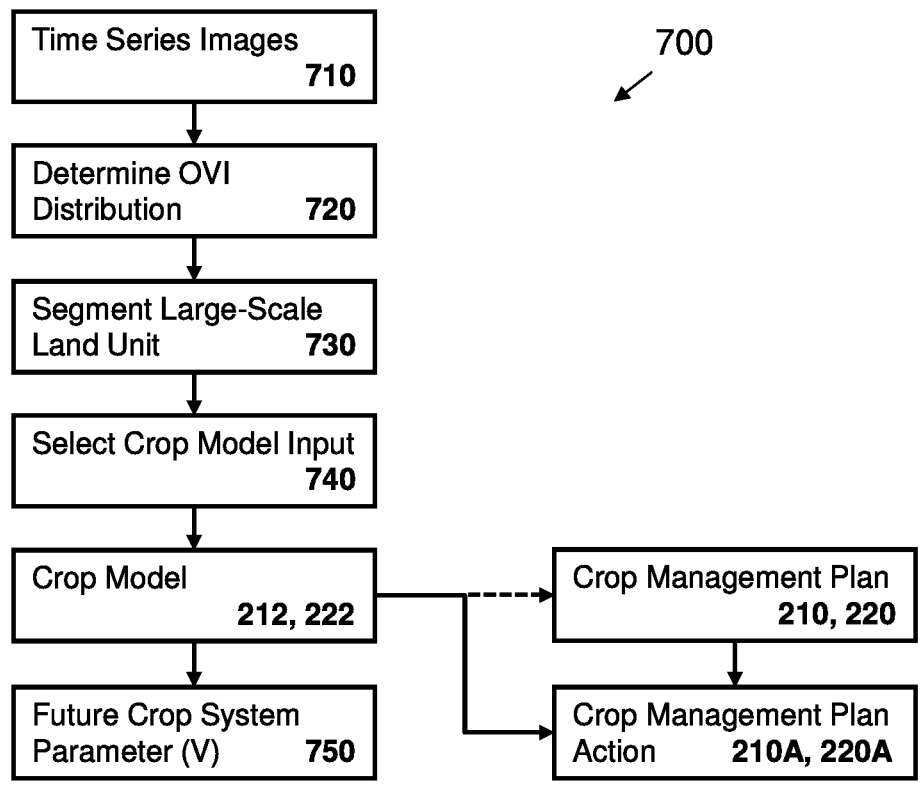
FIG. 6A is a process flow diagram illustrating a method according to the disclosure for mapping temporal and spatial stability of a cropping system within a growing season.

FIG. 6A is a process flow diagram illustrating a method 700 according to the disclosure for mapping temporal and spatial stability of a cropping system within a growing season. In an initial step 710, a plurality of images 402 is provided in a time series for example as acquired by satellite imaging, aerial imaging or remote sensing, or other means. The images 402 span a large-scale cropping system land unit 406 having crop plants planted thereon (e.g., at least one of soybean and corn plants; plants can be growing post-emergence thereon), and include a plurality of small-scale image subunits 404 (e.g., individual image pixels at the smallest resolution of a digital image; collections of image pixels at a desired intermediate resolution of a digital image) encompassing the large-scale cropping system land unit 406. The images 404 at a given element $t_j$ in the time series correspond to different time points in a single growth season for the cropping system.

In another step 720, a distribution of an optical vegetative index for the large-scale cropping system land unit 406 is determined at a selected time series element $t_j$ (e.g., a time series element prior to application of nitrogen or other fertilizer) based on the small-scale image subunits 404 therein at the time selected series element $t_j$ and having the crop plants thereon. In a refinement, the distribution of the optical vegetative index (OVI) can be a discrete or histogram representation of the distribution, or a continuous representation of the distribution based on discrete/histogram crop model data. Alternatively or additionally, the distribution can be a cumulative (or percentile) distribution or a probability density function). Determination of the distribution can exclude small-scale image subunits 404 without the crop plants (such as without either of soybean or corn) thereon, such as a forested area, plants other than the specific crop plants of interest, whether an agricultural crop or otherwise, an urban area, etc.

Figure 6B:
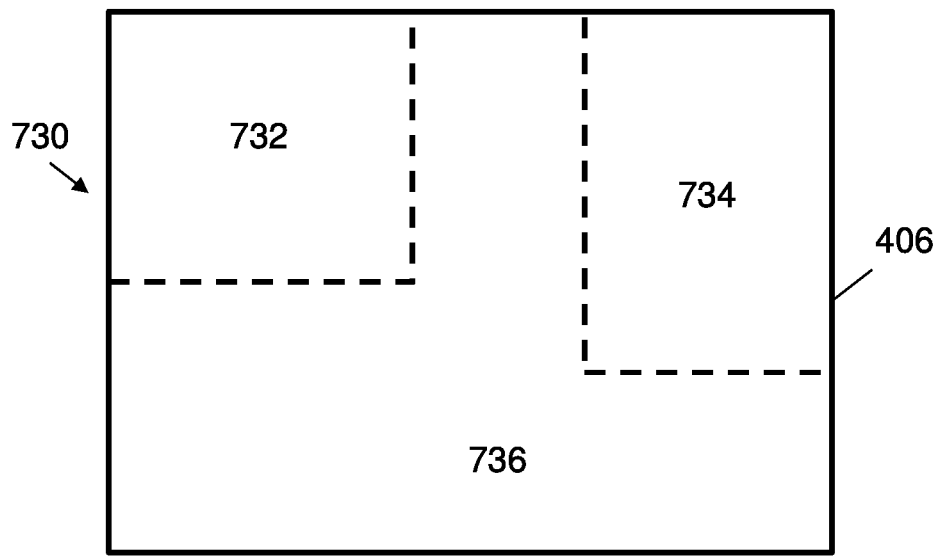
FIG. 6B is an illustrative region segmentation for a large-scale cropping system land unit resulting from the process of FIG. 6A.

In another step 730, the large-scale cropping system land unit 406 is segmented (e.g., segmented in the crop model representation thereof) into a plurality of regions based on the distribution of the optical vegetative index (OVI) for the small-scale image subunits 404 therein at the selected time series element $t_j$. Segmentation can be based on a percentile distribution for the OVI across the large scale land unit 406 at the segmentation time series element. For example, the large scale land unit 406 can be segmented into three regions depending on which small-scale image subunits 404 fall into the 0-33, 34-66, and 67-100 percentiles for cumulative OVI distribution, respectively. FIG. 6B is an illustrative region segmentation 730 for a large-scale cropping system land unit 406 resulting from the process of FIG. 6A. The segmentation map 730 includes four illustrative regions: Region 732 has a local (subunit 404) OVI value within the 0-33 percentile bracket of the OVI distribution of the subunits 404, region 734 has a local (subunit 404) OVI value within the 34-66 percentile bracket of the OVI distribution of the subunits 404, and region 736 has a local (subunit 404) OVI value within the 67-100 percentile bracket of the OVI distribution of the subunits 404.

In another step 740, one or more crop model input parameters specific to each segmented region are selected based on the optical vegetative index for the small-scale image subunits 404 within each segmented region and for each time series element $t_j$. For example, the OVI values for (all) subunits 404 within a given region over the entire time series $t_j$ can be used to iteratively select otherwise unknown crop model input parameters (such as any of a variety of soil parameters) to be uniform within, but specific to, the given region such that the crop model output run for the time series better reproduces the measured OVI data via known correlations between crop model outputs related to biomass, etc. and biomass reflectance which determines a calculated OVI for comparison/calibration of the crop model for a specific field and specific growing season. This helps to characterize in-season spatial variability within a large scale field land unit 406 and can be used to improve future crop model predictions and corresponding crop management decisions within a single growing season.

In another step or steps, a crop model 212, 222 and the selected one or more crop model input parameters specific to each segmented region from part (d) are used to determine (i) a crop management plan action 210A, 220A for a portion or all of the large-scale cropping system land unit 406 at a future time within the current growth season, and/or (ii) a dependent cropping system parameter 750 at a future time within the current growth season (e.g., using the crop model to provide improved, in-season predictions using spatially dependent input parameters specific to each segmented region within the large scale land unit). As illustrated in the general context of FIG. 1, the results from the process 700 can be incorporated pre- or post-planting (e.g., mid growing season) into crop modeling 212, 222, crop management plan 210, 220 determination, and/or crop management plan action 210A, 220A implementation.

Examples

Figure 7A:
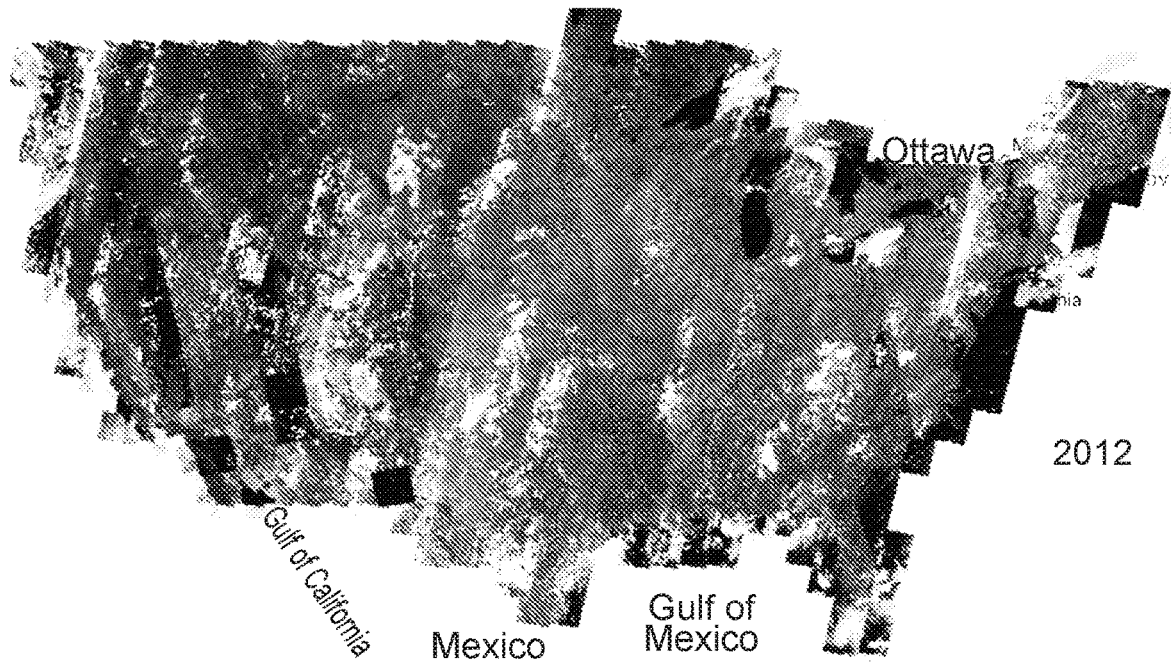
FIGS. 7A-7D illustrate the disclosed method for mapping temporal and spatial stability of a cropping system with LANDSAT satellite imagery covering the United States for the years 2011-2015 with 30 m² images.

FIGS. 7A-7D illustrate the disclosed method for mapping temporal and spatial stability of a cropping system with LANDSAT satellite imagery covering the United States for the years 2011-2015 (i.e., a 5-year time series with 5 time series elements) with 30 m$^2$ images (i.e., each taken during the summer growth season at an LAI value of about 3 during a cloud-free day). FIG. 7A is a representative composite LANDSAT satellite image for the United States in 2012, the image being composed of a plurality of smaller images on a 30 m$^2$ scale such that the final composite image covers essentially the entire continental United States. Analogous composite LANDSAT satellite images during the years 2011 and 2013-2015 (not shown) were also obtained, thus providing the 5-year time series with 5 time series elements for temporal and spatial stability analysis and mapping.

Figure 7B:
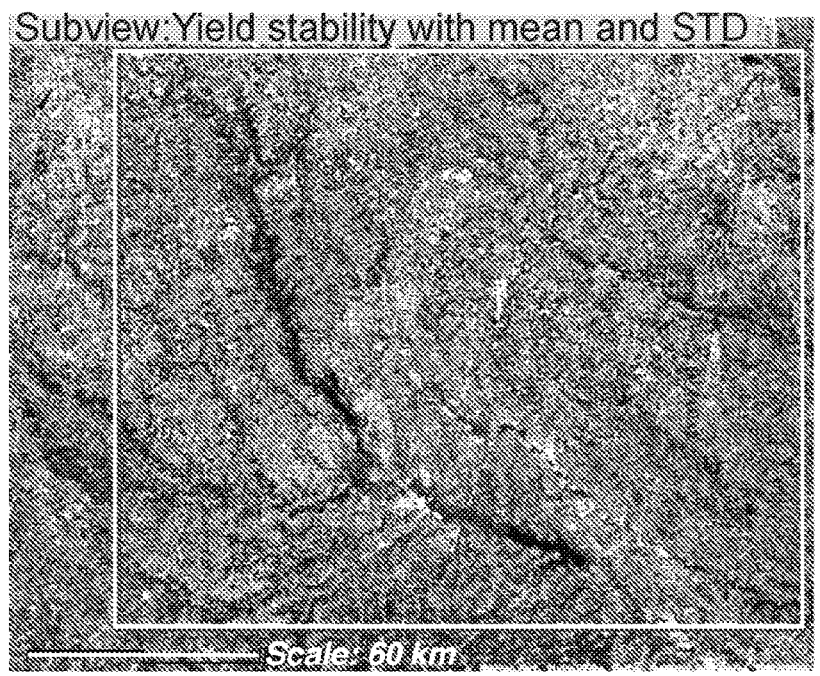
Figure 7C:
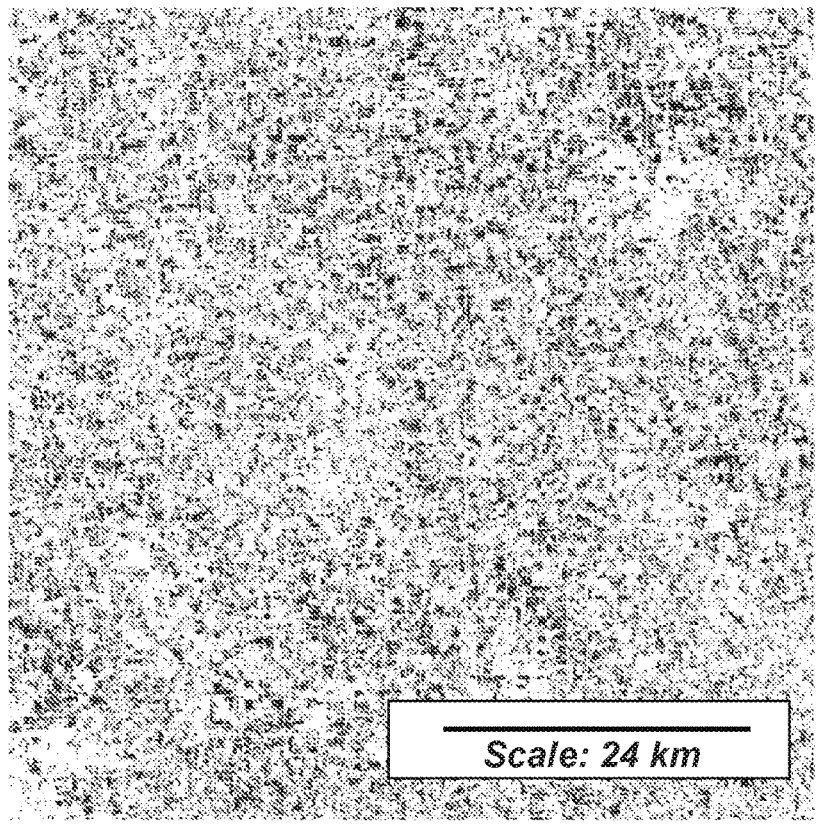
Figure 7D:

Although FIG. 7A is illustrated as a greyscale image, the original image (as well as those from the other years) permits determination of reflectance values at a desired wavelength (i.e., "R[X]" or "p[X]" at a wavelength of "X" nanometers) and at the small-scale subunit of 30 m$^2$, thus permitting determination of desired optical vegetation indices used for temporal and spatial stability mapping, FIGS. 7B-7D illustrate determination of stability parameters according to the disclosure using the NDVI optical vegetative index (OVI) on various scales for a large-scale land unit in Iowa (e.g., generally including crop land areas, such as for corn or soybean), including about 140 km×170 km (or about 87 mile×106 mile; FIG. 7B), about 80 km×80 km (or about 50 mile×50 mile; FIG. 7C), or about 1.61 km×1.61 km (or about 1 mile×1 mile (1 square mile); FIG. 7D). The small-scale subunits are 30 m$^2$ in each case. Using the NDVI optical vegetative index and the disclosed temporal and spatial stability mapping method, FIGS. 7B-7D illustrate classification of the NDVI optical vegetative index for the small-scale image subunit relative to the average NDVI optical vegetative index for the large-scale land unit as either high or low relative to the average. Further, FIGS. 7B-7D illustrate classification of the NDVI optical vegetative index temporal variability for the small-scale image subunit relative to the NDVI optical vegetative index temporal variability for the large-scale land unit as either stable (low variability) or unstable (high variability) relative to the large-scale land unit variability. FIGS. 7B-7D are shown as greyscale image maps for illustrative purposes, mapping the large-scale land unit and classifying sub-regions corresponding to the small-scale subunits within each large-scale land unit as (i) high or low relative to the average OVI, but unstable relative to the OVI variability for its large-scale land unit (white), (ii) stable relative to the OVI variability, but low relative to the average OVI for its large-scale land unit (black/dark grey), or (iii) stable relative to the OVI variability, and high relative to the average OVI for its large-scale land unit (light grey). Of course, more classification categories can be used relative to the average OVI and/or the OVI variability, for example utilizing a color contour map to represent several different classification categories.

FIG. 8 illustrates a representative sustainability index including contributions from crop yield, nitrogen use efficiency ("NUE"), water use efficiency ("WUE"), surface water runoff (or just "runoff"), nitrate leaching (or just "leaching"), soil organic carbon change (or "C % change"), carbon dioxide emission, and nitrous oxide emission as dependent cropping system parameters. Sustainability scores are assigned based on the value of a given crop system parameter in a small-scale land subunit according to a percentile distribution. In the illustrated embodiment, percentile ranges of 0-25, 26-50, 51-75, 76-100 (e.g., quartiles) have corresponding assigned sustainability scores of 1, 1.333, 1.667, 2 or 2, 1.667, 1.333, 1 respectively, depending whether lowest percentile bracket represents an undesirable value or a desirable value for the crop system parameter, respectively.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

1) Basso International Publication WO 2016/090212
2) Basso International Publication WO 2016/183182
3) Broge, N., et al., *Remote Sensing of Environment* 76 (2000): 156-172.
4) Cammarano et al., *Remote Sensing*, vol. 6, pp. 2827-2844 (2014)
5) Cammarano et al., *Agronomy Journal*, vol. 103, pp. 1597-1603 (2011)
6) Curran, P., et al., *Tree Physiology* 15 (1995): 203-206.
7) Daughtry, C., et al., *Remote Sensing Environment* 74 (2000): 229-239
8) Dalt, B., *Journal of Plant Physiology* 154 (1999): 30-36.
9) Gitelson, A., et al., *Journal of Plant Physiology* 143 (1994): 286-292.
10) Haboudane, D., et al., *Remote Sensing of Environment* 90 (2004): 337-352.
11) Sims, D., et al., *Remote Sensing of Environment* 81 (2002): 337-354.
12) Vogelmann, J., et al., *International Journal of Remote Sensing* 14 (1993): 1563-1575.

What is claimed is:

1. A method for growing crop plants using a sustainable crop management plan, the method comprising:
   (a) planting based on an initial crop management plan one or more crop plants on a large-scale cropping system land unit and on a plurality of small-scale land subunits within the large-scale cropping system land unit, the initial crop management plan being based on one or more of crop model output using field data for the large-scale cropping system land unit, past practice for the large-scale cropping system land unit, and present practice for the large-scale cropping system land unit;
   (b) computing using a computer and a crop model two or more dependent cropping system parameters for the one or more crop plants growing on the large-scale cropping system land unit over a plurality of time series elements and for the plurality of small-scale land subunits within the large-scale land unit, wherein:
      the two or more dependent cropping system parameters are selected from the group consisting of crop yield, nitrogen use efficiency, water use efficiency, surface water runoff, nitrate leaching, soil organic carbon change, carbon dioxide emission, nitrous oxide emission, and combinations thereof; and
      the time series elements represent at least 2 prior growing seasons; and
      computing the two or more dependent cropping system parameters using the computer and the crop model comprises simulating a water balance, a carbon balance, a heat balance, and a nutrient balance to determine the dependent cropping system parameters as crop model outputs;
   (c) computing using a computer a distribution of each computed dependent cropping system parameter based on the plurality of time series elements and the plurality of small-scale land subunits;
   (d) assigning a sustainability score for each computed dependent cropping system parameter in the plurality of time series elements and the plurality of small-scale land subunits based on a ranking of the computed dependent cropping system parameter relative to the distribution for the computed dependent cropping system parameter over all time series elements and all small-scale land subunits;
   (e) computing using a computer a sustainability index as a weighted combination of the sustainability score for each of the computed dependent cropping system parameters at each time series element and each small-scale land subunit; and
   (f) implementing a different crop management plan action for a portion or all of the large-scale cropping system land unit based on the sustainability index for the small-scale land subunits individually or in aggregate for the portion or all of the large-scale cropping system land unit, wherein implementing the different crop management plan action comprises:
      selecting a different, future crop management plan relative to the initial crop management plan for the portion or all of the large-scale cropping system land unit based on whether computation by the crop model indicates that the change will increase the current sustainability index while increasing or maintaining the current economic productivity of the large-scale cropping system land unit; and
      performing a different crop management action for the portion or all of the large-scale cropping system land unit based on the different, future crop management plan, thereby increasing the current sustainability index while increasing or maintaining the current economic productivity of the large-scale cropping system land unit, the different crop management action comprising one or more of planting a different selected crop plant species or cultivar on, differently tilling, performing different pest management on, differently irrigating, differently fertilizing, planting the crop plant at a different selected time on, harvesting the crop plant at a different selected time from, and selecting a different crop plant population for the portion or all of the large-scale cropping system land unit.

2. The method of claim 1, further comprising:
representing the sustainability index for the small-scale land subunits as a spatial map over the large-scale land unit at a selected time series element.

3. The method of claim 1, further comprising:
computing using a computer an average sustainability index for the large-scale land unit based on an average of the sustainability index for the small-scale land subunits for each time series element.

4. The method of claim 1, wherein the different, future crop management plan is selected based on an indication by the crop model that the change will increase the current sustainability index while increasing the current economic productivity of the large-scale cropping system land unit.

5. The method of claim 1, wherein the computed dependent cropping system parameter distribution is a discrete cumulative distribution with two or more histogram bins spanning the distribution each with a corresponding sustainability score.

6. The method of claim 1, wherein the time series elements represent sequential growing seasons for crop plants grown or to be grown on the large-scale land unit.

7. The method of claim 1, wherein the time series elements represent 5-30 past growing seasons for crop plants grown on the large-scale land unit.

8. The method of claim 1, wherein the time series elements further represent 5-30 future growing seasons for crop plants to be grown on the large-scale land unit.

9. The method of claim 1, wherein the time series elements further represent 5-30 past and future growing seasons for crop plants grown and to be grown on the large-scale land unit.

10. The method of claim 1, wherein:
the small-scale land subunits represent a spatial resolution ranging from $(0.01 \text{ m})^2$ to $(50 \text{ m})^2$;
the large-scale cropping system land unit represents a land area ranging from $5,000 \text{ m}^2$ to $5,000,000 \text{ m}^2$; and
there are 5 to 50,000 small-scale land subunits encompassing the large-scale cropping system land unit.

11. The method of claim 10, wherein the large-scale cropping system land unit represents a land area of about $2,589,000 \text{ m}^2$.

12. The method of claim 10, wherein the large-scale cropping system land unit represents a single cultivated field.

13. The method of claim 10, wherein the large-scale cropping system land unit represents a common land unit (CLU).

14. The method of claim 10, wherein the different, future crop management plan relative to the initial crop management plan is spatially variable, the different, future crop management plan comprising at least two future crop management plans that (i) are also different relative to each other with respect to one or more of crop plant species, crop plant cultivar, tilling plan, pest management schedule, pest management chemicals, irrigation amount, irrigation schedule, fertilization amount, fertilization type, fertilization schedule, planting time, harvest time, and crop plant population; and (ii) are for different portions of the large-scale cropping system land unit.

15. The method of claim 1, wherein:
the small-scale land subunits represent a spatial resolution ranging from $(1 \text{ m})^2$ to $(50 \text{ m})^2$;
the large-scale cropping system land unit represents a land area of at least $50,000 \text{ m}^2$; and
there are at least 100 small-scale land subunits encompassing the large-scale cropping system land unit.

16. The method of claim 15, wherein the different, future crop management plan relative to the initial crop management plan is spatially variable, the different, future crop management plan comprising at least two future crop management plans that (i) are also different relative to each other with respect to one or more of crop plant species, crop plant cultivar, tilling plan, pest management schedule, pest management chemicals, irrigation amount, irrigation schedule, fertilization amount, fertilization type, fertilization schedule, planting time, harvest time, and crop plant population; and (ii) are for different portions of the large-scale cropping system land unit.

17. The method of claim 1, wherein:
the small-scale land subunits represent a spatial resolution ranging from $(0.01 \text{ m})^2$ to $(1 \text{ m})^2$;
the large-scale cropping system land unit represents a land area of at least $5,000 \text{ m}^2$; and
there are at least 1000 small-scale land subunits encompassing the large-scale cropping system land unit.

18. The method of claim 17, wherein the different, future crop management plan relative to the initial crop management plan is spatially variable, the different, future crop management plan comprising at least two future crop management plans that (i) are also different relative to each other with respect to one or more of crop plant species, crop plant cultivar, tilling plan, pest management schedule, pest management chemicals, irrigation amount, irrigation schedule, fertilization amount, fertilization type, fertilization schedule, planting time, harvest time, and crop plant population; and (ii) are for different portions of the large-scale cropping system land unit.

19. The method of claim 1, wherein the crop management action comprises fertilizing the portion or all of the large-scale cropping system land unit according to one or more of a selected fertilization amount, a selected fertilization type, and a selected fertilization schedule.

20. The method of claim 1, wherein:
computing the two or more dependent cropping system parameters using the computer and the crop model comprises calibrating the crop model using past practice, actual crop yield, and actual weather for the large-scale cropping system land unit over the at least 2 prior growing seasons.

21. The method of claim 1, wherein the dependent cropping system parameters are crop yield, nitrogen use efficiency, water use efficiency, surface water runoff, nitrate leaching, soil organic carbon change, carbon dioxide emission, and nitrous oxide emissions.

22. The method of claim 1, wherein:
computing the two or more dependent cropping system parameters using the computer and the crop model further comprises using as crop model inputs a plurality of varied crop management parameters selected from the group consisting of crop plant species, crop plant cultivar, tilling plan, pest management schedule, pest management chemicals, irrigation amount, irrigation schedule, fertilization amount, fertilization type, fertilization schedule, planting time, harvest time, and combinations thereof.

23. The method of claim 1, wherein:
computing the two or more dependent cropping system parameters using the crop model further comprises using as crop model inputs a plurality of varied crop the computer and management parameters selected from the group consisting of fertilization amount, fertilization type, fertilization schedule, and combinations thereof.

24. The method of claim 23, wherein:
computing the two or more dependent cropping system parameters using the computer and the crop model further comprises using as crop model inputs one or more of past crop yield, soil data, and weather data for the large-scale cropping system land unit.

25. The method of claim 1, wherein the different, future crop management plan relative to the initial crop management plan is spatially variable, the different, future crop management plan comprising at least two future crop management plans that (i) are also different relative to each other with respect to one or more of crop plant species, crop plant cultivar, tilling plan, pest management schedule, pest management chemicals, irrigation amount, irrigation schedule, fertilization amount, fertilization type, fertilization schedule, planting time, harvest time, and crop plant population; and (ii) are for different portions of the large-scale cropping system land unit.

* * * * *